US012791358B2

(12) United States Patent
Watanabe et al.

(10) Patent No.: US 12,791,358 B2
(45) Date of Patent: Nov. 10, 2026

(54) MAGNETIC SENSOR DEVICE, MAGNETIC SENSOR SYSTEM, AND OPERATION DETECTION DEVICE

(71) Applicant: TDK Corporation, Tokyo (JP)

(72) Inventors: Kazuya Watanabe, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 212 days.

(21) Appl. No.: 18/829,419

(22) Filed: Sep. 10, 2024

(65) Prior Publication Data

US 2025/0102324 A1 Mar. 27, 2025

(30) Foreign Application Priority Data

Sep. 26, 2023 (JP) ................................ 2023-163660

(51) Int. Cl.
*G01D 5/16* (2006.01)
*G01B 7/30* (2006.01)

(52) U.S. Cl.
CPC *G01D 5/16* (2013.01); *G01B 7/30* (2013.01)

(58) Field of Classification Search
CPC .......... G01D 5/16; G01D 5/145; G01D 5/165; G01B 7/30; G01B 7/003; G01R 33/093; G01R 33/0005
USPC .................................................... 324/207.21
See application file for complete search history.

(56) References Cited

U.S. PATENT DOCUMENTS

2009/0132192 A1* 5/2009 Seo ........................ G01D 3/028 702/94
2009/0219016 A1 9/2009 Debrailly
2011/0068780 A1 3/2011 Sakai
2018/0172474 A1 6/2018 Ausserlechner
2021/0405132 A1 12/2021 Kubota
2023/0152125 A1 5/2023 Park et al.

FOREIGN PATENT DOCUMENTS

JP 2008-196938 A 8/2008
JP 2009-122057 A 6/2009
JP 2009271054 A * 11/2009
JP 2015-129660 A 7/2015
WO WO-2020250489 A1 * 12/2020 ........... G01R 33/098

OTHER PUBLICATIONS

Sep. 2, 2025 Office Action issued in Japanese Patent Application No. 2023-163660.

* cited by examiner

*Primary Examiner* — Arleen M Vazquez
*Assistant Examiner* — Robert P Alejnikov, Jr.
(74) *Attorney, Agent, or Firm* — Oliff PLC

(57) ABSTRACT

A magnetic sensor device includes a magnetic sensor and a processor. Each of a plurality of detection circuits of the magnetic sensor includes a magnetoresistive (MR) element. The MR element includes a free layer having a magnetic vortex structure and configured so that the center of the magnetic vortex structure moves depending on a target magnetic field. The plurality of detection circuits are configured to generate a plurality of detection signals each of which changes periodically with periodic changes in the direction of the target magnetic field and whose amplitude changes with a change in the strength of the target magnetic field. The processor is configured to generate an angle detection value and a strength detection value based on the plurality of detection signals.

11 Claims, 14 Drawing Sheets

MAGNETIC SENSOR DEVICE, MAGNETIC SENSOR SYSTEM, AND OPERATION DETECTION DEVICE

CROSS REFERENCE TO RELATED APPLICATIONS

This application claims the benefit of Japanese Priority Patent Application No. 2023-163660 filed on Sep. 26, 2023, the entire contents of which are incorporated herein by reference.

BACKGROUND

The technology relates to a magnetic sensor device including a magnetoresistive element using a free layer having a magnetic vortex structure, and a magnetic sensor system and an operation detection device each including the magnetic sensor device.

In recent years, angle sensors that generate an angle detection value having a correspondence with an angle to be detected have been widely used in various applications, including detection of the rotational position of a steering wheel or a power steering motor in an automobile. Examples of the angle sensors include one using a magnetic detection element. An angle sensor system using a magnetic detection element typically includes a magnetic field generator that generates a magnetic field to be detected whose direction rotates in conjunction with the rotation or linear motion of a target object. An example of the magnetic field generator is a magnet. The angle to be detected has a correspondence with an angle that the direction of the magnetic field to be detected at a reference position forms with a reference direction.

For the magnetic detection element, a spin-valve magnetoresistive element is used, for example. The spin-valve magnetoresistive element includes a magnetization pinned layer having a magnetization whose direction is fixed, a free layer having a magnetization whose direction is variable depending on the direction of an applied magnetic field, and a gap layer located between the magnetization pinned layer and the free layer.

As an angle sensor using a spin-valve magnetoresistive element, as disclosed in US 2021/0405132 A1, an angle sensor including two detection circuits that each include a bridge circuit using magnetoresistive elements and have output characteristics with respective different phases has been known. Aside from the angle sensor, US 2021/0405132 A1 also discloses a magnetic field strength sensor using magnetoresistive elements including free layers having a magnetic vortex structure (also referred to as a vortex structure). The angle sensor and the magnetic field strength sensor are disposed on the same substrate to constitute a single magnetic sensor.

Some angle sensor systems are desired to detect both the rotation and linear motion of a target object. In such a case, the direction and strength of a magnetic field to be detected can be both detected using a magnetic sensor such as disclosed in US 2021/0405132 A1. However, the magnetic sensor disclosed in US 2021/0405132 A1 has a problem that the magnetic sensor is difficult to reduce in size since the angle sensor and the magnetic field strength sensor are separately provided.

SUMMARY

A magnetic sensor device according to one embodiment of the technology includes a magnetic sensor configured to detect a target magnetic field, and a processor. The magnetic sensor includes a plurality of detection circuits each including a magnetoresistive element. The magnetoresistive element includes a magnetization pinned layer having a magnetization whose direction is fixed, and a free layer having a magnetic vortex structure and configured so that a center of the magnetic vortex structure moves depending on the target magnetic field. The plurality of detection circuits are configured to generate a plurality of detection signals each of which changes periodically with periodic changes in a direction of the target magnetic field and whose amplitude changes with a change in a strength of the target magnetic field. The processor is configured to generate an angle detection value and a strength detection value based on the plurality of detection signals, the angle detection value having a correspondence with an angle that the direction of the target magnetic field forms with a reference direction, the strength detection value having a correspondence with the strength of the target magnetic field.

A magnetic sensor system according to one embodiment of the technology includes the magnetic sensor device according to one embodiment of the technology, and a magnetic field generator configured to generate the target magnetic field.

An operation detection device according to one embodiment of the technology includes a component configured to be capable of an operation to rotate circumferentially about a reference axis and an operation to move in a direction parallel to the reference axis, the magnetic sensor device according to one embodiment of the technology, and a magnetic field generator configured to generate the target magnetic field and operate in conjunction with the component.

Other and further objects, features, and advantages of the technology will appear more fully from the following description.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
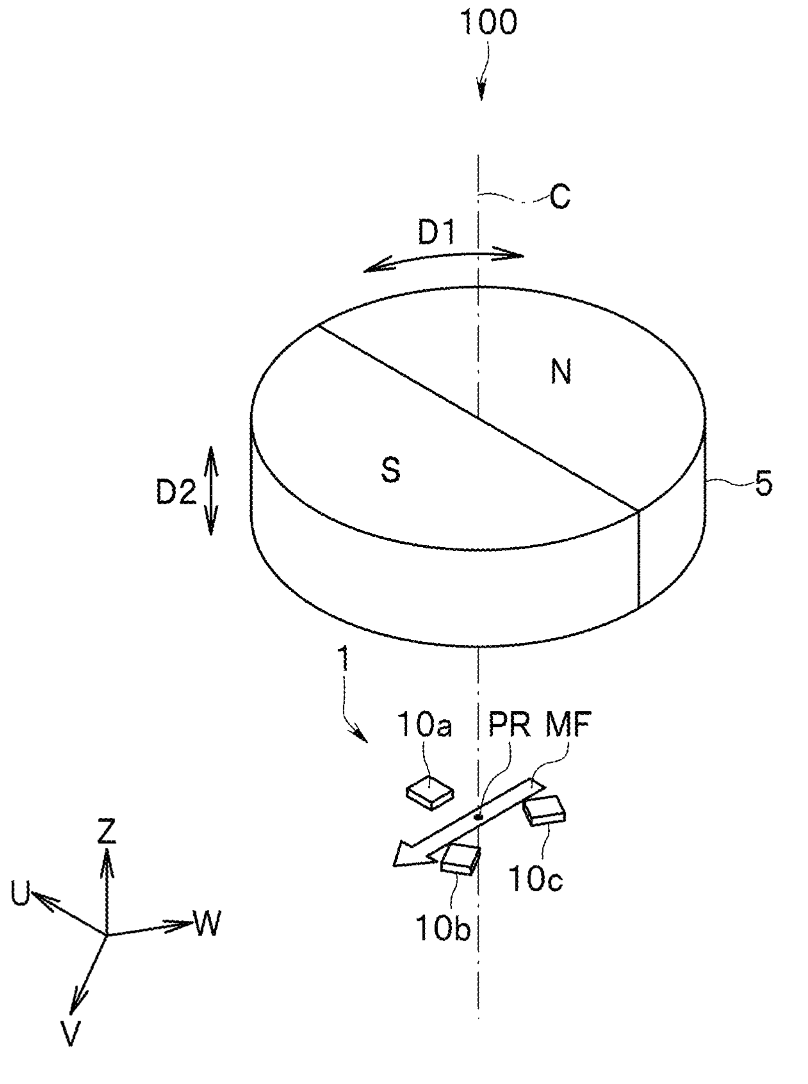
FIG. 1 is a perspective view showing a magnetic sensor system according to a first example embodiment of the technology.

An object of the technology is to provide a magnetic sensor device capable of detecting both the direction and strength of the target magnetic field with a simple configuration, and a magnetic sensor system and an operation detection device each including the magnetic sensor device.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

First Example Embodiment

Figure 2:
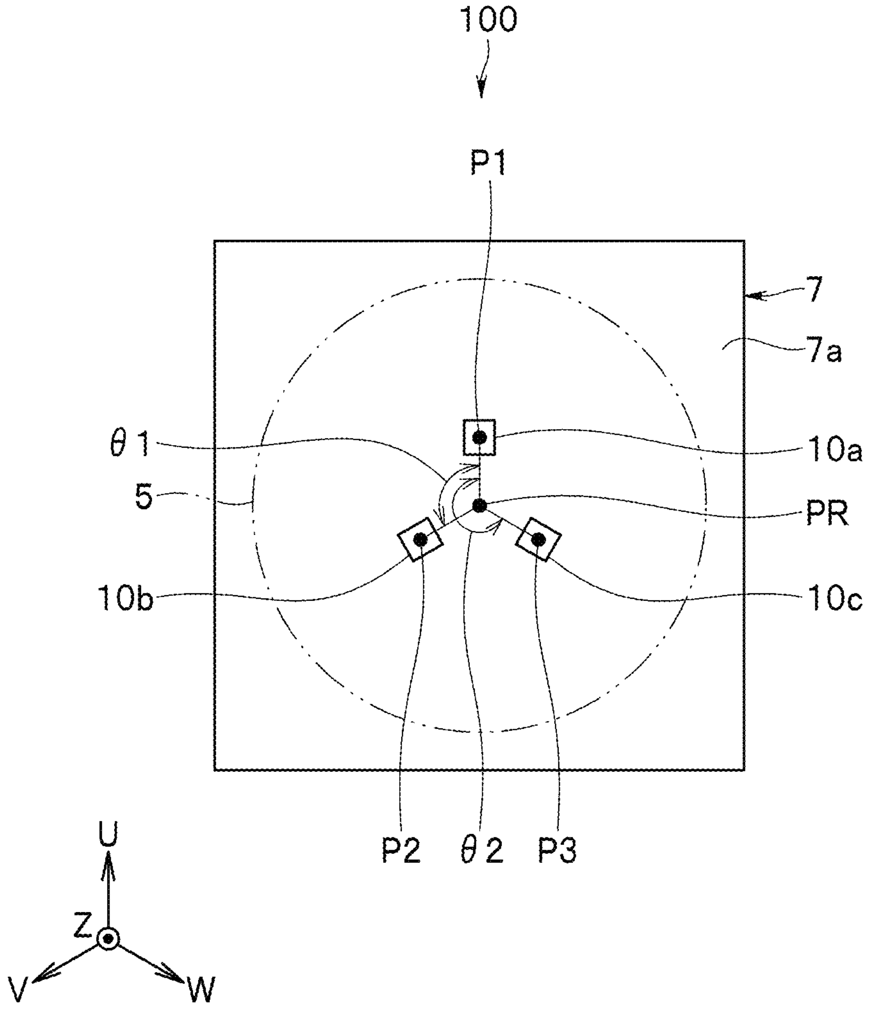
FIG. 2 is a plan view showing the magnetic sensor system according to the first example embodiment of the technology.

A configuration of a magnetic sensor system according to a first example embodiment of the technology will initially be described with reference to FIGS. 1 and 2. FIG. 1 is a perspective view showing a magnetic sensor system 100 according to the example embodiment. FIG. 2 is a plan view showing the magnetic sensor system 100 according to the example embodiment. The magnetic sensor system 100 according to the example embodiment is a magnetic angle sensor system, and includes a magnetic sensor 1 and a magnetic field generator 5.

The magnetic field generator 5 generates a magnetic field to be detected related to an angle to be detected. The magnetic field to be detected by the magnetic sensor 1 will hereinafter be referred as a target magnetic field MF. The magnetic field generator 5 in the example embodiment is a cylindrical magnet. The magnetic field generator 5 has an N pole and an S pole symmetrically arranged about an imaginary plane including the center axis of the cylinder. The magnetic field generator 5 is configured to rotate in a circumferential direction D1 about the center axis of the cylinder. The direction of the target magnetic field MF thus rotates about a reference axis C including the center axis of the cylinder. The magnetic field generator 5 is further configured to move in a direction D2 parallel to the reference axis C.

As employed herein, the angle to be detected will be referred to as a target angle and denoted by the symbol θ. The target angle θ in the example embodiment is an angle corresponding to a rotation angle θM of the magnetic field generator 5.

Figure 3:
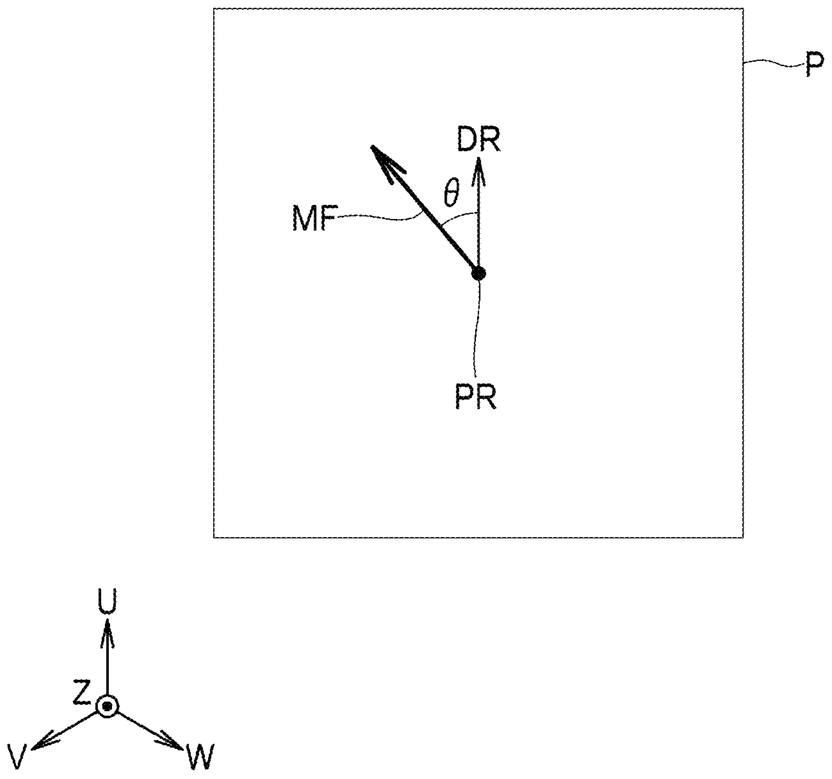
FIG. 3 is an explanatory diagram for describing a target magnetic field in the first example embodiment of the technology.

FIG. 3 is an explanatory diagram for describing the target magnetic field MF. In FIG. 3, the symbol P denotes a reference plane that is an imaginary plane perpendicular to the reference axis C. Within the reference plane P, the direction of the target magnetic field MF rotates about a reference position PR that is a position on the reference axis C. The reference direction DR lies within the reference plane P and intersects the reference position PR. In the following description, the direction of the target magnetic field MF refers to the direction within the reference plane P. The target angle θ is the angle that the direction of the target magnetic field MF forms with the reference direction DR. In FIG. 3, for the sake of convenience, the angle that the direction of the target magnetic field MF forms with the reference direction DR is represented by the symbol θ.

The direction of the target magnetic field MF is assumed to rotate counterclockwise in FIG. 3. The target angle θ is expressed by a positive value when viewed counterclockwise from the reference direction DR, and expressed by a negative value when viewed clockwise from the reference direction DR.

The magnetic sensor 1 is configured to detect the target magnetic field MF and generate at least one detection signal having a correspondence with the target angle θ. In particular, in the example embodiment, the magnetic sensor 1 is configured to detect the target magnetic field MF at each of a plurality of specific positions away from the reference axis C.

The magnetic sensor 1 includes a first detection circuit 10*a*, a second detection circuit 10*b*, and a third detection circuit 10*c*. The first to third detection circuits 10*a* to 10*c* are disposed to oppose one end surface of the magnetic field generator 5, i.e., the cylindrical magnet.

The first to third detection circuits 10*a* to 10*c* may each have a chip form, or a package form sealed with a sealing resin. If each of the first to third detection circuits 10*a* to 10*c* has a chip form, the magnetic sensor 1 may have a single package form with the first to third detection circuits 10*a* to 10*c* sealed with a sealing resin.

The first detection circuit 10*a* is configured to detect the target magnetic field MF at a first position P1 away from the reference axis C and generate a first detection signal S1 that changes periodically with periodic changes in the target magnetic field MF and whose amplitude changes with a change in the strength of the target magnetic field MF. The second detection circuit 10*b* is configured to detect the target magnetic field MF at a second position P2 away from the reference axis C and generate a second detection signal S2 that changes periodically with the periodic changes in the target magnetic field MF and whose amplitude changes with the change in the strength of the target magnetic field MF. The third detection circuit 10*c* is configured to detect the target magnetic field MF at a third position P3 away from the reference axis C and generate a third detection signal S3 that changes periodically with the periodic changes in the target magnetic field MF and whose amplitude changes with the change in the strength of the target magnetic field MF. The direction and strength of the target magnetic field MF at each of the first to third positions P1 to P3 are assumed to agree with those of the target magnetic field MF at the reference position PR.

The first to third detection signals S1 to S3 may include respective periodic components that change with the same period. In particular, in the example embodiment, the periodic components change periodically with a predetermined signal period to trace ideal sinusoidal curves (including sine and cosine waveforms). As the magnetic field generator 5 rotates one revolution, i.e., the rotation angle θM changes by 360°, the periodic components change by one period. The amplitude of the periodic component of the first detection signal S1, the amplitude of the periodic component of the second detection signal S2, and the amplitude of the periodic component of the third detection signal S3 may be the same.

The first to third positions P1 to P3 will now be described in detail. Each of the first to third positions P1 to P3 may be located on the reference plane P. Alternatively, at least one of the first to third positions P1 to P3 may be located away from the reference plane P. In the following description, the first to third positions P1 to P3 are assumed to fall on the reference plane P. The first to third positions P1 to P3 may be located on an imaginary circle about the reference position PR.

As shown in FIG. 2, the second position P2 is a position rotated from the first position P1 by an angle θ1 circumferentially about the reference axis C. The third position P3 is a position rotated from the first position P1 by an angle θ2 circumferentially about the reference axis C.

The periodic components have a period of 360° in electrical angle. The angle θ1 is equivalent to an electrical angle of 120°. The angle θ2 is equivalent to an electrical angle of 240°. In particular, in the example embodiment, a physical angle equivalent to the electrical angle of 120° is also 120°. A physical angle equivalent to the electrical angle of 240° is also 240°.

Now, a U direction, a V direction, a W direction, and a Z direction will be defined as shown in FIGS. 1 to 3. In the example embodiment, the direction parallel to the reference axis C shown in FIG. 1 and upward in FIG. 1 is defined as the Z direction. In FIGS. 2 and 3, the Z direction is shown as a direction from the far side to the near side of FIGS. 2 and 3. A direction orthogonal to the Z direction and from the reference axis C toward the first position P1 is defined as the U direction. A direction orthogonal to the Z direction and from the reference axis C toward the second position P2 is defined as the V direction. A direction orthogonal to the Z direction and from the reference axis C toward the third position P3 is defined as the W direction. In particular, in the example embodiment, the V direction is the direction rotated from the U direction counterclockwise in FIGS. 2 and 3 by 120°. The W direction is the direction rotated from the V direction counterclockwise in FIGS. 2 and 3 by 120°, and from the U direction clockwise in FIGS. 2 and 3 by 120°. The opposite direction to the U direction is referred to as a −U direction. The opposite direction to the V direction is referred to as a −V direction. The opposite direction to the W direction is referred to as a −W direction. The opposite direction to the Z direction is referred to as a −Z direction. A coordinate system with reference to the reference axis C will hereinafter be referred to as a reference coordinate system.

In the reference coordinate system and an orthogonal coordinate system to be described below, the term "above" hereinafter refers to positions located forward of a reference position in the Z direction, and "below" refers to positions opposite from the "above" positions with respect to the reference position. In the example embodiment, the reference direction DR is the U direction.

The magnetic sensor 1 further includes a support 7 that supports the first to third detection circuits 10*a* to 10*c*. The support 7 is located at a predetermined distance from the magnetic field generator 5 in the direction parallel to the reference axis C. The support 7 has a top surface 7*a* opposed to the magnetic field generator 5. The top surface 7*a* may be perpendicular to the reference axis C, i.e., the Z direction. In such a case, the reference plane may be the top surface 7*a* or a plane parallel to the top surface 7*a*. In the example shown in FIG. 2, the first to third detection circuits 10*a* to 10*c* are disposed on the top surface 7*a* of the support 7.

The configuration of the magnetic sensor system 100 according to the example embodiment is not limited to the example shown in FIG. 1. The magnetic sensor system 100 according to the example embodiment may have any configuration where the relative positional relationship between the magnetic field generator 5 and the magnetic sensor 1 changes so that the direction of the target magnetic field MF at the reference position PR rotates when viewed from the magnetic sensor 1. For example, when the magnetic field generator 5 and the magnetic sensor 1 are located as shown in FIG. 1, the magnetic field generator 5 may be fixed and the magnetic sensor 1 may rotate in the circumferential direction D1. The magnetic field generator 5 and the magnetic sensor 1 may rotate in opposite directions along the circumferential direction D1. The magnetic field generator 5 and the magnetic sensor 1 may rotate in the same circumferential direction D1 at respective different angular speeds.

The magnetic sensor system 100 according to the example embodiment may have any configuration where the relative positional relationship between the magnetic field generator 5 and the magnetic sensor 1 changes so that the strength of the target magnetic field MF at the reference position PR changes. For example, when the magnetic field generator 5 and the magnetic sensor 1 are located as shown in FIG. 1, the magnetic field generator 5 may be fixed and the magnetic sensor 1 may move in the direction D2. The magnetic field generator 5 and the magnetic sensor 1 may move in opposite directions along the direction D2. The magnetic field generator 5 and the magnetic sensor 1 may move in the same direction D2 by respective different distances. Note that the reference position PR is assumed to move with the movement of the magnetic sensor 1.

Figure 4:
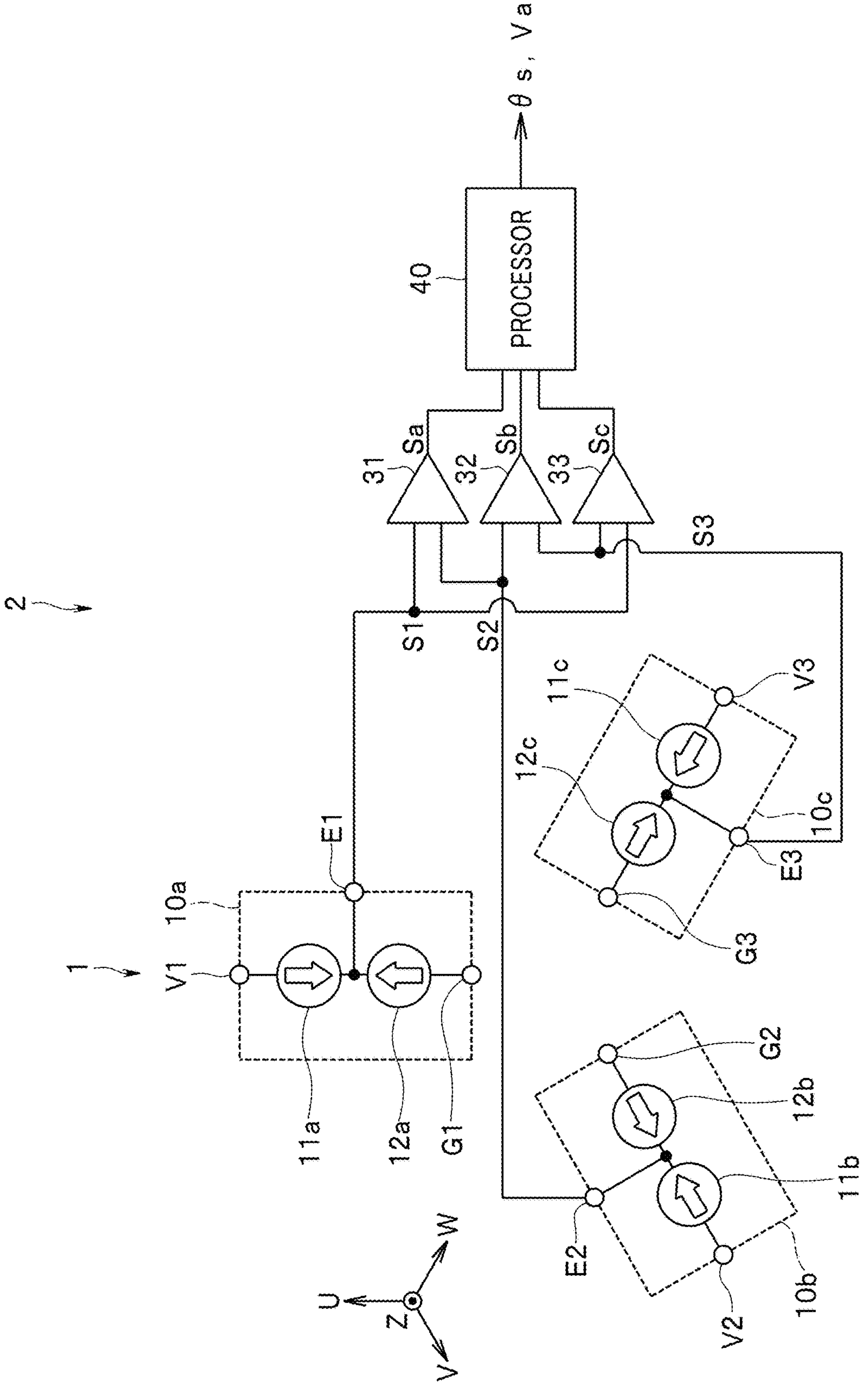
FIG. 4 is a circuit diagram showing a configuration of the magnetic sensor device according to the first example embodiment of the technology.

Next, a configuration of the magnetic sensor 1 will be described in detail with reference to FIG. 4. FIG. 4 is a circuit diagram showing a configuration of a magnetic sensor device according to the example embodiment.

A magnetic sensor device 2 according to the example embodiment includes the magnetic sensor 1 and a processor 40. The processor 40 is configured to generate an angle detection value θs and a strength detection value Va based on the first to third detection signals S1 to S3. The angle detection value θs has a correspondence with the angle that the direction of the target magnetic field MF forms with the reference direction DR, i.e., the target angle θ. The strength detection value Va has a correspondence with the strength of the target magnetic field MF at a predetermined position. The predetermined position may be the reference position PR.

For example, the processor 40 can be implemented by an application-specific integrated circuit (ASIC) or a microcomputer. The processor 40 may be included in the support 7 shown in FIG. 2, or located away from the first to third detection circuits 10*a* to 10*c* and the magnetic field generator 5.

The first detection circuit 10*a* includes the first magnetic detection element. The first magnetic detection element changes in characteristic with the target magnetic field MF at the first position P1, i.e., the target magnetic field MF applied to the first detection circuit 10*a*. In particular, in the present example embodiment, the first detection circuit 10*a* includes two magnetoresistive elements (hereinafter, referred to as MR elements) 11*a* and 12*a* as the first magnetic detection element. The first detection circuit 10*a* further includes a power supply port V1, a ground port G1, and an output port E1. The MR element 11*a* is provided between the power supply port V1 and the output port E1 in circuit configuration. The MR element 12*a* is provided between the ground port G1 and the output port E1 in the circuit configuration. A voltage or current of predetermined magnitude is applied to the power supply port V1. The ground port G1 is grounded. In this application, the expression "in (the) circuit configuration" is used to indicate a layout in a circuit diagram and not a layout in a physical configuration.

The second detection circuit 10*b* includes a second magnetic detection element. The second magnetic detection element changes in characteristic with the target magnetic field MF at the second position P2, i.e., the target magnetic field MF applied to the second detection circuit 10*b*. In particular, in the example embodiment, the second detection circuit 10*b* includes two MR elements 11*b* and 12*b* as the second magnetic detection element. The second detection circuit 10*b* further includes a power supply port V2, a ground port G2, and an output port E2. The MR element 11*b* is provided between the power supply port V2 and the output port E2 in the circuit configuration. The MR element 12*b* is provided between the ground port G2 and the output port E2 in the circuit configuration. A voltage or current of predetermined magnitude is applied to the power supply port V2. The ground port G2 is grounded.

The third detection circuit 10*c* includes a third magnetic detection element. The third magnetic detection element changes in characteristic with the target magnetic field MF at the third position P3, i.e., the target magnetic field MF applied to the third detection circuit 10*c*. In particular, in the example embodiment, the third detection circuit 10*c* includes two MR elements 11*c* and 12*c* as the third magnetic detection element. The third detection circuit 10*c* further includes a power supply port V3, a ground port G3, and an output port E3. The MR element 11*c* is provided between the power supply port V3 and the output port E3 in the circuit configuration. The MR element 12*c* is provided between the ground port G3 and the output port E3 in the circuit configuration. A voltage or current of predetermined magnitude is applied to the power supply port V3. The ground port G3 is grounded.

The magnetic sensor device 2 further includes differential detectors 31, 32, and 33. The differential detector 31 outputs a signal corresponding to a potential difference between the output ports E1 and E2 as a first signal Sa. The differential detector 32 outputs a signal corresponding to a potential difference between the output ports E2 and E3 as a second signal Sb. The differential detector 33 outputs a signal corresponding to a potential difference between the output ports E3 and E1 as a third signal Sc.

The first to third signals Sa to Sc may be generated by digital signal processing. More specifically, each of the differential detectors 31, 32, and 33 may be configured with a differential analog-to-digital converter such as an ASIC and a microcomputer. In such a case, the differential detectors 31, 32, and 33 may be integrated with the processor 40. Alternatively, the first to third signals Sa to Sc may be generated by analog signal processing. More specifically, each of the differential detectors 31, 32, and 33 may be configured with a circuit using an operational amplifier. In such a case, the differential detectors 31, 32, and 33 may be integrated with the processor 40 or separate from the processor 40.

As employed herein, any one of the first to third detection circuits 10*a* to 10*c* will be denoted by the reference numeral 10. Of the MR elements included in the detection circuit 10, one corresponding to the MR element 11*a*, 11*b*, or 11*c* will be denoted by the reference numeral 11, and one corresponding to the MR element 12*a*, 12*b*, or 12*c* by the reference numeral 12.

Figure 5:
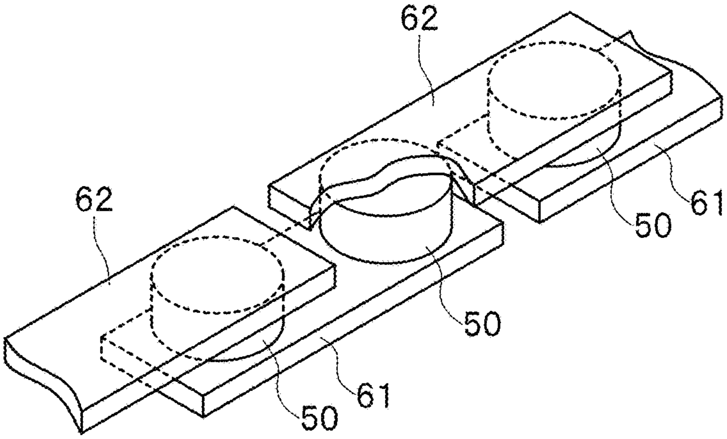
FIG. 5 is a perspective view showing a part of a magnetoresistive element in the first example embodiment of the technology.

The configuration of the MR elements 11 and 12 will be described in detail below with reference to FIG. 5. FIG. 5 is a perspective view showing part of the MR elements 11 and 12.

Each of the MR elements 11 and 12 includes at least one layered film. In particular, in the example embodiment, each of the MR elements 11 and 12 includes a plurality of layered films 50 connected in series as the at least one layered film. Each of the MR elements 11 and 12 further includes a plurality of lower electrodes 61 and a plurality of upper electrodes 62. Each of the plurality of lower electrodes 61 has a long slender shape. There is a gap between longitudinally adjacent two of the lower electrodes 61. Layered films 50 are disposed on the top surface of each lower electrode 61, near respective longitudinal ends of the lower electrode 61. Each of the plurality of upper electrodes 62 has a long slender shape, and electrically connects two adjacent layered films 50 that are located on two longitudinally adjacent lower electrodes 61.

Although not shown, one layered film 50 located at an end of a row of layered films 50 is connected to another layered film 50 located at an end of another row of layered films 50 adjacent in a direction intersecting the longitudinal direction of the lower electrodes 61. The two layered films 50 are connected to each other by a not-shown electrode. The not-shown electrode may be one connecting the bottom surfaces or the top surfaces of the two layered films 50 to each other.

The magnetic sensor 1 further includes a not-shown substrate and a not-shown insulating layer. The detection circuit 10 is disposed on the substrate and integrated by the insulating layer.

The magnetic sensor 1 further includes a not-shown plurality of electrode pads. The plurality of electrode pads include power-supply-port electrode pads corresponding to the power supply ports V1, V2, and V3, ground-port electrode pads corresponding to the ground ports G1, G2, and G3, and output-port electrode pads corresponding to the output ports E1, E2, and E3. These electrode pads and the MR elements 11 and 12 are electrically connected.

Figure 6:
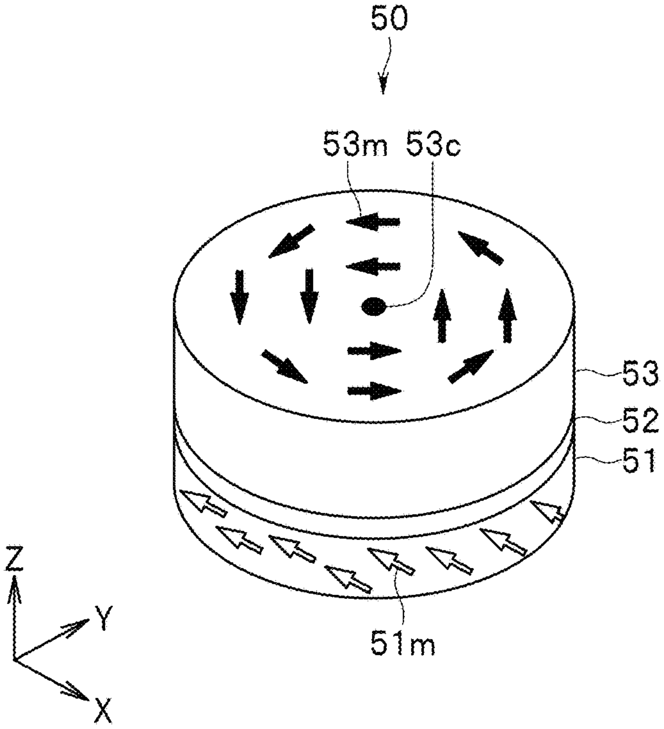
FIG. 6 is a perspective view showing a layered film of the magnetoresistive element in the first example embodiment of the technology.
Figure 7:
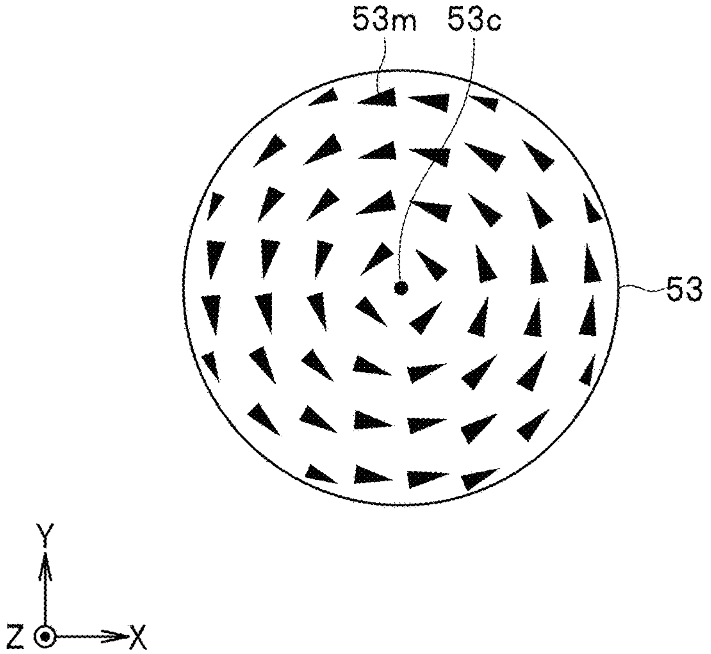
FIG. 7 is a plan view showing a free layer of the layered film of the magnetoresistive element in the first example embodiment of the technology.

Next, an example of the configuration of the layered films 50 in each of the MR elements 11 and 12 will be described with reference to FIGS. 6 and 7. FIG. 6 is a perspective view showing a layered film 50 of the MR elements 11 and 12. FIG. 7 is a plan view showing a free layer of the layered film of the MR elements 11 and 12.

Here, as shown in FIGS. 6 and 7, an X direction, a Y direction, and a Z direction are defined. The X, Y, and Z directions are orthogonal to one another. The opposite directions to the X, Y, and Z directions are defined as −X, −Y, and −Z directions, respectively. An orthogonal coordinate system defined by the X, Y, and Z directions shown in FIGS. 6 and 7 are one defined with reference to the detection circuit 10. The Z direction of this orthogonal coordinate system agrees with that of the reference coordinate system defined based on the reference axis C shown in FIG. 1.

A layered film 50 includes a magnetization pinned layer 51 having a magnetization 51*m* whose direction is fixed, a free layer 53, and a gap layer 52 located between the magnetization pinned layer 51 and the free layer 53. The material and shape of the free layer 53 are selected so that the free layer 53 has a magnetic vortex structure (also referred to as a vortex structure). The gap layer 52 is a tunnel barrier layer or a nonmagnetic conductive layer.

The free layer 53 has a cylindrical or substantially cylindrical shape. The free layer 53 has a magnetization 53*m* that is vortical about a center 53*c* of the magnetic vortex structure. When there is no magnetic field applied to the layered film 50, the center 53*c* of the magnetic vortex structure agrees or substantially agrees with the axis of the cylinder. The center 53*c* of the magnetic vortex structure moves depending on the target magnetic field MF. In the example shown in FIGS. 6 and 7, the layered film 50 has a cylindrical overall shape.

The center 53*c* of the magnetic vortex structure moves if a component of the target magnetic field MF in a direction orthogonal to the Z direction is applied to the free layer 53. The free layer 53 preferably does not saturate within the range of variations in the strength of the component.

The magnetization 51*m* of the magnetization pinned layer 51 includes a component in the direction parallel to the X direction. The magnetization 51*m* of the magnetization pinned layer 51 in the MR element 11 and the magnetization 51*m* of the magnetization pinned layer 51 in the MR element 12 include components in opposite directions.

If the magnetization 51*m* of the magnetization pinned layer 51 includes a component in a specific direction, the component in the specific direction may be the main component of the magnetization 51*m* of the magnetization pinned layer 51. Alternatively, the magnetization 51*m* of the magnetization pinned layer 51 may be free of a component in a direction orthogonal to the specific direction. In the example embodiment, if the magnetization 51*m* of the magnetization pinned layer 51 includes a component in the specific direction, the direction of the magnetization 51*m* of the magnetization pinned layer 51 is the same or substantially the same as the specific direction.

The layered film 50 may further include an antiferromagnetic layer. The antiferromagnetic layer is formed of an antiferromagnetic material and is in exchange coupling with the magnetization pinned layer 51 to thereby pin the direction of the magnetization 51*m* of the magnetization pinned layer 51. Alternatively, the magnetization pinned layer 51 may be a so-called self-pinned layer (Synthetic Ferri Pinned layer, SFP layer). The self-pinned layer has a stacked ferri structure in which a ferromagnetic layer, a nonmagnetic intermediate layer, and a ferromagnetic layer are stacked, and the two ferromagnetic layers are antiferromagnetically coupled.

Figure 8:
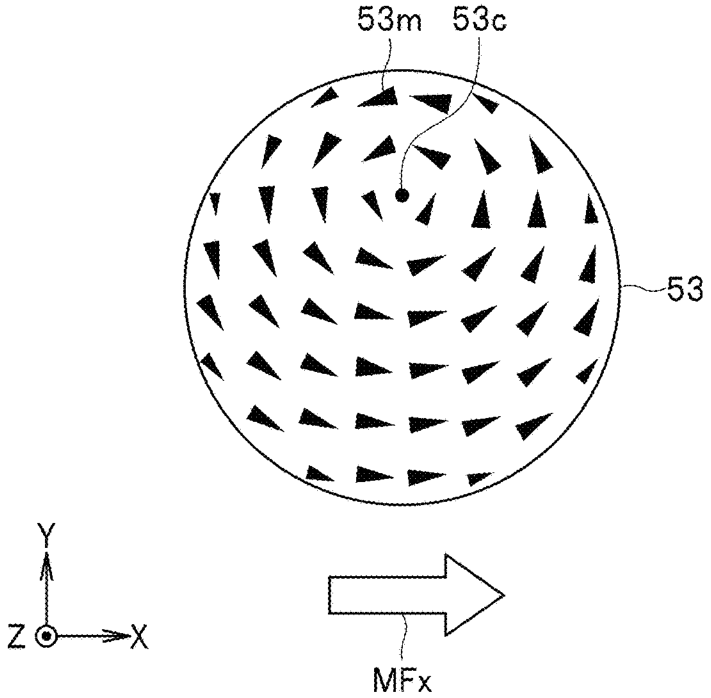
FIG. 8 is a plan view showing the free layer when a target magnetic field is applied to the magnetoresistive element in the first example embodiment of the technology.
Figure 9:
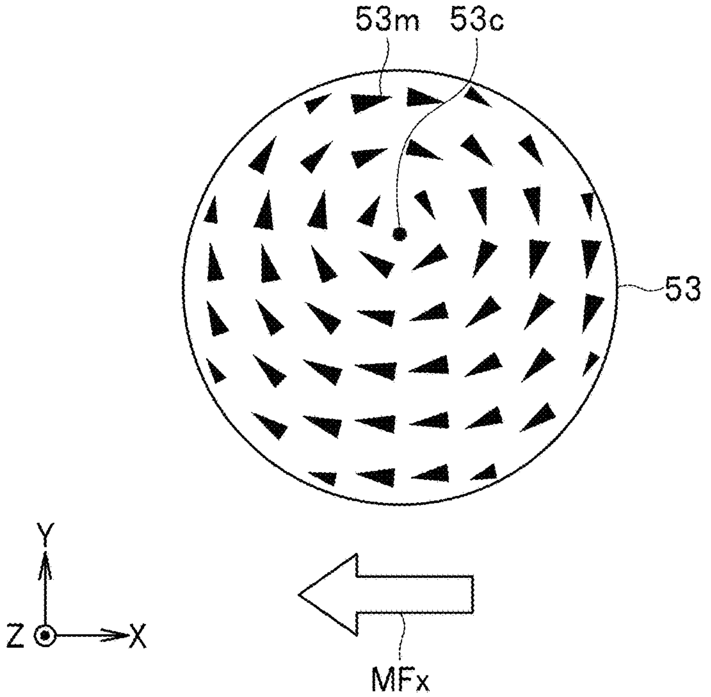
FIG. 9 is a plan view showing the free layer when a target magnetic field is applied to the magnetoresistive element in the first example embodiment of the technology.

The resistance of the layered film 50 will now be described by using an example case where the direction of the magnetization 51*m* of the magnetization pinned layer 51 is the −X direction. FIGS. 8 and 9 show the free layer 53 when a magnetic field component MFx of the target magnetic field MF in a direction parallel to the X direction is applied to the free layer 53.

FIG. 8 shows the free layer 53 when the direction of the magnetic field component MFx is the X direction. In such a case, the center 53*c* of the magnetic vortex structure moves due to the magnetic field component MFx, and the amount of the magnetization 53*m* oriented in the X direction becomes greater than that of the magnetization 53*m* oriented in the −X direction. Here, the resistance of the layered film 50 increases.

FIG. 9 shows the free layer 53 when the direction of the magnetic field component MFx is the −X direction. In such a case, the center 53*c* of the magnetic vortex structure moves due to the magnetic field component MFx, and the amount of the magnetization 53*m* oriented in the −X direction becomes greater than that of the magnetization 53*m* oriented in the X direction. Here, the resistance of the layered film 50 decreases.

The amount of change in the resistance of the layered film 50 depends on the strength of the magnetic field component MFx. If the direction of the magnetic field component MFx is the X direction, the amount of the magnetization 53*m* oriented in the X direction increases as the strength of the magnetic field component MFx increases. The resistance of the layered film 50 increases as the amount of the magnetization 53*m* oriented in the X direction increases. If the direction of the magnetic field component MFx is the −X direction, the amount of the magnetization 53*m* oriented in the −X direction increases as the strength of the magnetic field component MFx increases. The resistance of the layered film 50 decreases as the amount of the magnetization 53*m* oriented in the −X direction increases. As the strength of the magnetic field component MFx increases, the resistance of the layered film 50 changes so that the amount of increase or the amount of decrease increases. As the strength of the magnetic field component MFx decreases, the resistance of the layered film 50 changes so that the amount of increase or the amount of decrease decreases.

The amount of change in the resistance of each of the MR elements 11 and 12 depends on the strength of the magnetic field component MFx that each of the plurality of layered films 50 receives. As the strength of the magnetic field component MFx increases, the resistance of each of the MR elements 11 and 12 changes so that the amount of increase or the amount of decrease increases. As the strength of the magnetic field component MFx decreases, the resistance of each of the MR elements 11 and 12 changes so that the amount of increase or the amount of decrease decreases. The strength of the magnetic field component MFx depends on the strength of the component of the target magnetic field MF applied to each of the MR elements 11 and 12 and in the direction parallel to the X direction.

As described above, the magnetization of the magnetization pinned layer 51 in the MR element 11 and the magnetization of the magnetization pinned layer 51 in the MR element 12 include components in opposite directions. As the direction and strength of the target magnetic field MF applied to the detection circuit 10 change, the resistances of the respective MR elements 11 and 12 therefore change so that the resistance of the MR element 11 increases and the resistance of the MR element 12 decreases, or the resistance of the MR element 11 decreases and the resistance of the MR element 12 increases. Consequently, the potential at the connection point of the MR elements 11 and 12 changes.

The first detection circuit 10*a* generates a signal corresponding to the potential at the output port E1 connected to the connection point of the MR elements 11*a* and 12*a* as the first detection signal S1. The second detection circuit 10*b* generates a signal corresponding to the potential at the output port E2 connected to the connection point of the MR elements 11*b* and 12*b* as the second detection signal S2. The third detection circuit 10*c* generates a signal corresponding to the potential at the output port E3 connected to the connection point of the MR elements 11*c* and 12*c* as the third detection signal S3.

Figure 10:
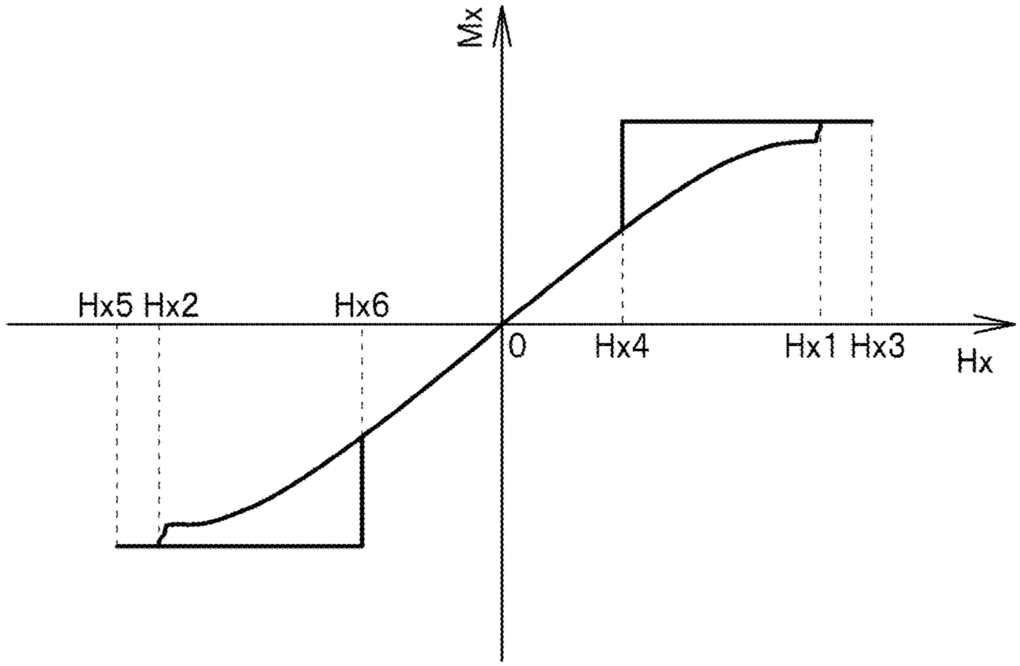
FIG. 10 is a characteristic chart showing a relationship between the strength of a magnetic field component and the magnitude of a magnetization of an entire free layer in the first example embodiment of the technology.

Now, a relationship between the strength of the magnetic field component MFx and the magnitude of the magnetization of the entire free layer 53 will be described with reference to FIG. 10. FIG. 10 is a characteristic chart schematically showing the relationship between the strength of the magnetic field component MFx and the magnitude of the magnetization of the entire free layer 53. In FIG. 10, the horizontal axis indicates the strength Hx of the magnetic field component MFx, and the vertical axis indicates the magnitude Mx of the magnetization of the entire free layer 53. In FIG. 10, the strength Hx when the direction of the magnetic field component MFx is the X direction is expressed by a positive value, and the strength Hx when the direction of the magnetic field component MFx is the −X direction is expressed by a negative value. If the direction of the magnetic field component MFx is the X direction, the magnitude Mx of the magnetization of the entire free layer 53 increases as the amount of the magnetization 53*m* oriented in the X direction increases. If the direction of the magnetic field component MFx is the −X direction, the magnitude Mx of the magnetization of the entire free layer 53 decreases as the amount of the magnetization 53*m* oriented in the −X direction increases.

Initially, a case where the strength Hx is increased from 0 will be described. As the strength Hx increases gradually from 0, the magnitude Mx of the magnetization increases gradually. Once the strength Hx reaches or exceeds a value Hx1, the magnitude Mx of the magnetization becomes constant and the free layer 53 is saturated.

Next, a case where the strength Hx is decreased from 0 will be described. As the strength Hx decreases gradually from 0, the magnitude Mx of the magnetization also decreases gradually. Once the strength Hx falls to or below a value Hx2, the magnitude Mx of the magnetization becomes constant and the free layer 53 is saturated.

As shown in FIG. 10, in a predetermined range where the strength Hx is greater than the value Hx2 and less than the value Hx1, the magnitude Mx of the magnetization changes linearly with respect to a change in the strength Hx. As employed herein, "change linearly" means that in the characteristic chart showing the relationship between the strength Hx and the magnitude Mx of the magnetization, the magnitude Mx of the magnetization changes linearly or near linearly with respect to a change in the strength Hx.

In the example embodiment, within the changing range of the strength Hx, the free layer 53 is preferably not saturated and the magnitude Mx of the magnetization more preferably changes linearly with respect to a change in the strength Hx.

If the strength Hx exceeds the value Hx1 to saturate the free layer 53 and is then decreased from a value Hx3 greater than the value Hx1, the magnitude Mx of the magnetization changes little until the strength Hx reaches a value Hx4 smaller than the value Hx1. Once the strength Hx falls below the value Hx4, the magnitude Mx of the magnetization changes linearly with respect to a change in the strength Hx as with the case where the strength Hx changes within the predetermined range greater than the value Hx2 and less than the value Hx1.

Similarly, if the strength Hx falls below the value Hx2 to saturate the free layer 53 and is then increased from a value Hx5 smaller than the value Hx2, the magnitude Mx of the magnetization changes little until the strength Hx reaches a value Hx6 greater than the value Hx2. Once the strength Hx exceeds the value Hx6, the magnitude Mx of the magnetization changes linearly with respect to a change in the strength Hx as with the case where the strength Hx changes within the range greater than the value Hx2 and less than the value Hx1.

Next, a relationship between the reference coordinate system shown in FIGS. 1 to 4 and the orthogonal coordinate system shown in FIGS. 6 to 9 will be described. The orthogonal coordinate system shown in FIGS. 6 to 9 is defined for each of the first to third detection circuits 10*a* to 10*c*. For the first detection circuit 10*a*, the X direction of the orthogonal coordinate system agrees with the U direction of the reference coordinate system, and the Y direction of the orthogonal coordinate system agrees with a direction 90° rotated from the U direction of the reference coordinate system toward the V direction of the reference coordinate system. For the second detection circuit 10*b*, the X direction of the orthogonal coordinate system agrees with the V direction of the reference coordinate system, and the Y direction of the orthogonal coordinate system agrees with a direction 90° rotated from the V direction of the reference coordinate system toward the W direction of the reference coordinate system. For the third detection circuit 10*c*, the X direction of the orthogonal coordinate system agrees with the W direction of the reference coordinate system, and the Y direction of the orthogonal coordinate system agrees with a direction 90° rotated from the W direction of the reference coordinate system toward the U direction of the reference coordinate system.

In FIG. 4, the MR elements 11*a*, 11*b*, 11*c*, 12*a*, 12*b*, and 12*c* are schematically shown by a figure representing a layered film 50 each. The arrow in the layered film 50 indicates the direction of the magnetization 51*m* of the magnetization pinned layer 51 of the layered film 50. In the first detection circuit 10*a*, the magnetization 51*m* of the magnetization pinned layer 51 of the MR element 11*a* includes a component in the −U direction, and the magnetization 51*m* of the magnetization pinned layer 51 of the MR element 12*a* includes a component in the U direction. In the second detection circuit 10*b*, the magnetization 51*m* of the magnetization pinned layer 51 of the MR element 11*b* includes a component in the −V direction, and the magnetization 51*m* of the magnetization pinned layer 51 of the MR element 12*b* includes a component in the V direction. In the third detection circuit 10*c*, the magnetization 51*m* of the magnetization pinned layer 51 of the MR element 11*c* includes a component in the −W direction, and the magnetization 51*m* of the magnetization pinned layer 51 of the MR element 12*c* includes a component in the W direction.

Next, a method for generating the angle detection value θs and the strength detection value Va will be described with reference to FIG. 4. The following description includes a description of the operation of the processor 40. In the example embodiment, a phase difference between the periodic component of the first detection signal S1 and the periodic component of the second detection signal S2 and a phase difference between the periodic component of the second detection signal S2 and the periodic component of the third detection signal S3 may be both ⅓ of the period of the periodic components. The phase of the periodic component of the second detection signal S2 differs from that of the periodic component of the first detection signal S1 by ⅓ of the period of the periodic components, i.e., 120°. The phase of the periodic component of the third detection signal S3 differs from that of the periodic component of the second detection signal S2 by ⅓ of the period of the periodic components, i.e., 120°. A phase difference between the periodic component of the first detection signal S1 and the periodic component of the third detection signal S3 may be ⅔ of the period of the periodic components. The phase of the periodic component of the third detection signal S3 differs from that of the periodic component of the first detection signal S1 by ⅔ of the period of the periodic components, i.e., 240°.

The first signal Sa output from the differential detector 31, the second signal Sb output from the differential detector 32, and the third signal Sc output from the differential detector 33 are expressed by the following Eqs. (1), (2), and (3), respectively:

$$Sa = S1 - S2, \tag{1}$$

$$Sb = S2 - S3, \text{ and} \tag{2}$$

$$Sc = S3 - S1. \tag{3}$$

The first signal Sa is equivalent to a difference between the first detection signal S1 and the second detection signal S2. The second signal Sb is equivalent to a difference between the second detection signal S2 and the third detection signal S3. The third signal Sc is equivalent to a difference between the third detection signal S3 and the first detection signal S1. The processor 40 may be configured to generate the angle detection value θs using the first to third signals Sa to Sc. For example, the processor 40 calculates θs within the range of 0° or more and less than 360° by using the following Eq. (4):
Here, "atan" represents an arctangent.

$$\theta s = a\tan\left(\frac{\sqrt{3}\,Sa}{Sc - Sb}\right) \tag{4}$$

Here, the signal obtained by multiplying the first signal Sa by the square root of 3 will be referred to as a first angle calculation signal Sd1. The signal obtained by subtracting the second signal Sb from the third signal Sc will be referred to as a second angle calculation signal Sd2. As can be seen from Eq. (4), the angle detection value θs can be calculated by determining the arctangent of the ratio of the first angle calculation signal Sd1 to the second angle calculation signal Sd2.

The processor 40 may be also configured to generate the strength detection value Va using the sum of squares of the first to third signals Sa to Sc. The processor 40 may assume the sum of squares of the first to third signals Sa to Sc as the strength detection value Va. Alternatively, the processor 40 may calculate Va by the following Eq. (5):

$$Va = \sqrt{Sa^2 + Sb^2 + Sc^2} \tag{5}$$

The processor 40 may be configured to detect the rotational position of the magnetic field generator 5 using the angle detection value θs, and detect the position of the magnetic field generator 5 in the direction D2 parallel to the reference axis C using the strength detection value Va. The rotational position of the magnetic field generator 5 can be calculated, for example, by using the angle detection value θs and the number of rotations of the magnetic field generator 5 counted based on the angle detection value θs. The position of the magnetic field generator 5 in the direction D2 parallel to the reference axis C can be calculated, for example, by multiplying the strength detection value Va by a predetermined coefficient.

Next, a method for manufacturing the magnetic sensor 1 according to the example embodiment will be briefly described. The method for manufacturing the magnetic sensor 1 includes a step of forming the detection circuit 10. The step of forming the detection circuit 10 includes a step of forming the MR elements 11 and 12. The step of forming the MR elements 11 and 12 includes a step of forming the plurality of layered films 50.

In the step of forming the plurality of layered films 50, a plurality of initial layered films to later become the plurality of layered films 50 are initially formed. Each of the plurality of initial layered films includes at least an initial magnetization pinned layer to later become the magnetization pinned layer 51, and the free layer 53 and the gap layer 52.

Next, the direction of the magnetization of the initial magnetization pinned layers is fixed to a predetermined direction using laser light and an external magnetic field in the predetermined direction. For example, the plurality of initial layered films to later become the plurality of layered films 50 of the MR element 11 are irradiated with the laser light while an external magnetic field in the −X direction is applied thereto. When the irradiation with the laser light is completed, the direction of the magnetization of the initial magnetization pinned layers is fixed to −X direction. The initial magnetization pinned layers thereby become the magnetization pinned layers 51, and the plurality of initial layered films become the plurality of layered films 50 of the MR element 11.

For other plurality of initial layered films 50 to later become the plurality of layered films 50 of the MR element 12, the direction of the magnetization of the initial magnetization pinned layer in each of the other plurality of initial layered films can be fixed to the X direction by setting the direction of the external magnetic field to the X direction. The plurality of layered films 50 of the MR element 12 are formed in such a manner.

Next, the operation and effects of the magnetic sensor device 2 and the magnetic sensor system 100 according to the example embodiment will be described. In the example embodiment, the angle detection value θs and the strength detection value Va can be both generated based on the first to third detection signals S1 to S3. This can be achieved by the use of the free layers 53 having a magnetic vortex structure. As shown in FIG. 10, in the predetermined range where the strength Hx of the magnetic field component MFx is greater than the value Hx2 and less than the value Hx1, the strength Hx of the magnetic field component MFx can be uniquely identified from the magnitude Mx of the magnetization of the entire free layer 53. The magnitude Mx of the magnetization of the entire free layer 53 has a correspondence with the amount of the magnetization 53*m* of the free layer 53 oriented in a specific direction. The amount of the magnetization 53*m* has a correspondence with the resistance of the layered film 50.

The resistances of the layered films 50 in the MR elements 11*a* and 12*a* have a correspondence with the first detection value S1. The resistances of the layered films 50 in the MR elements 11*b* and 12*b* have a correspondence with the second detection signal S2. The resistances of the layered films 50 in the MR elements 11*c* and 12*c* have a correspondence with the third detection signal S3. According to the example embodiment, the strength Hx of the magnetic field component MFx can thus be uniquely identified based on the first to third detection signals S1 to S3.

If the strength Hx of the magnetic field component MFx changes periodically within the predetermined range where the strength Hx of the magnetic field component MFx is greater than the value Hx2 and less than the value Hx1, the magnitude Mx of the magnetization of the entire free layer 53 changes periodically. As the strength Hx of the magnetic field component MFx changes periodically, the first to third detection signals S1 to S3 therefore also change periodically. In the example embodiment, the periodic component of the first detection signal S1, the periodic component of the second detection signal S2, and the periodic component of the third detection signal S3 have respective different phases. According to the example embodiment, the angle detection value θs can thus be generated based on the first to third detection signals S1 to S3.

Figure 11:
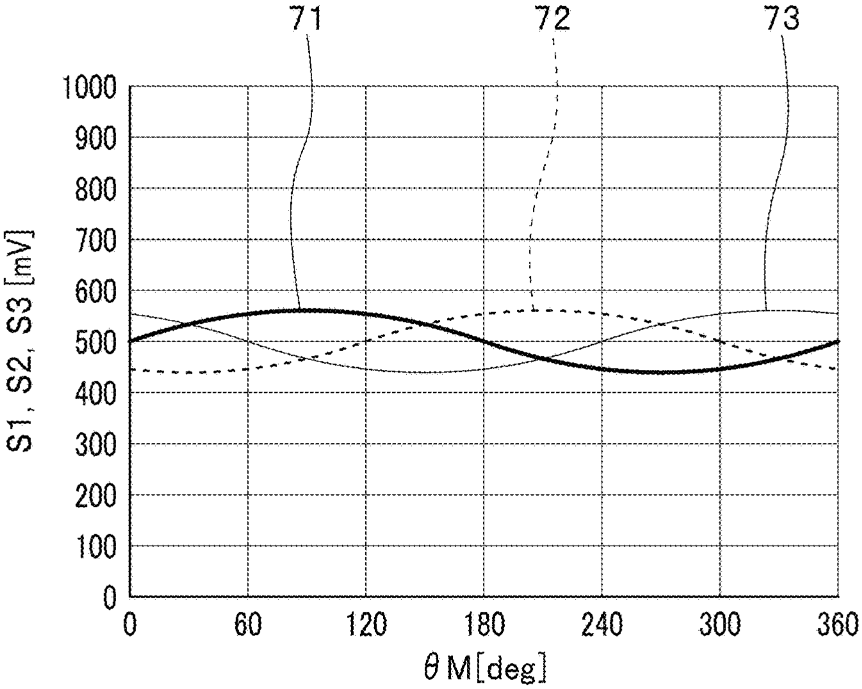
FIG. 11 is a waveform chart showing the waveforms of first to third detection signals of a first example in the first example embodiment of the technology.

Next, first and second examples of the first to third detection signals S1 to S3 and the strength detection value Va in the example embodiment will be described. The first example will initially be described. FIG. 11 is a waveform chart showing the waveforms of the first to third detection signals S1 to S3 of the first example. In FIG. 11, the horizontal axis indicates the rotation angle θM, and the vertical axis indicates the values of the first to third detection signals S1 to S3. In FIG. 11, the curve denoted by the reference numeral 71 represents the first detection signal S1, the curve denoted by the reference numeral 72 represents the second detection signal S2, and the curve denoted by the reference numeral 73 represents the third detection signal S3. FIG. 11 shows the first to third detection signals S1 to S3 when the value of the magnetic flux density corresponding to the target magnetic field MF is 20 mT.

Figure 12:
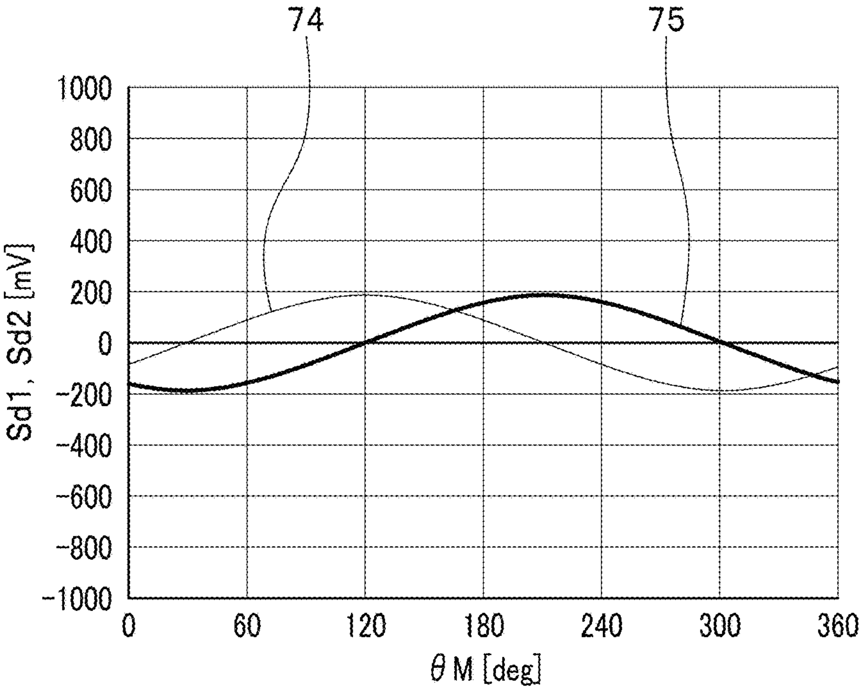
FIG. 12 is a waveform chart showing the waveforms of first and second angle calculation signals of the first example in the first example embodiment of the technology.

FIG. 12 is a waveform chart showing the waveforms of the first and second angle calculation signals Sd1 and Sd2 of the first example. In FIG. 12, the horizontal axis indicates the rotation angle θM, and the vertical axis indicates the values of the first and second angle calculation signals Sd1 and Sd2. In FIG. 12, the curve denoted by the reference numeral 74 represents the first angle calculation signal Sd1, and the curve denoted by the reference numeral 75 represents the second angle calculation signal Sd2. FIG. 12 shows the first and second angle calculation signals Sd1 and Sd2, which are generated using the first to third signals Sa to Sc that are generated using the first to third detection signals S1 to S3 illustrated in FIG. 11 and Eqs. (1) to (3). As shown in FIG. 12, the phase difference between the first and second angle calculation signals Sd1 and Sd2 is 90°. As described above, the angle detection value θs can thus be generated using the first and second angle calculation signals Sd1 and Sd2 and Eq. (4).

Figure 13:
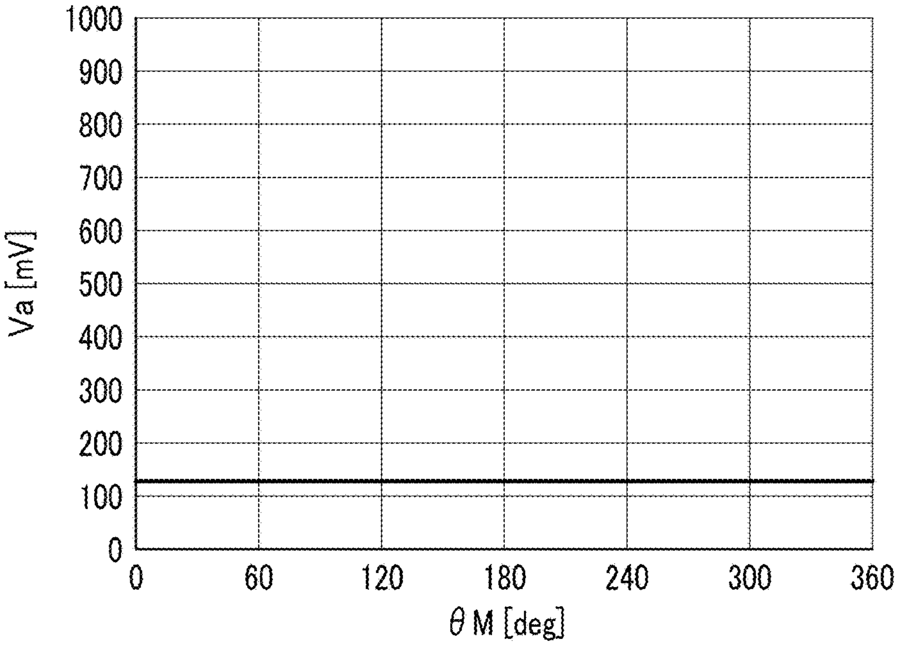
FIG. 13 is a characteristic chart showing a strength detection value of the first example in the first example embodiment of the technology.

FIG. 13 is a characteristic chart illustrating the strength detection value Va of the first example. In FIG. 13, the horizontal axis indicates the rotation angle θM, and the vertical axis indicates the value of the strength detection value Va. FIG. 13 shows the strength detection value Va generated using the first to third detection signals S1 to S3 shown in FIG. 11 and Eq. (4). As shown in FIG. 13, in an environment where the strength of the target magnetic field MF is constant, the value of the strength detection value Va is constant. The strength detection value Va shown in FIG. 13 is in units of mV. The processor 40 may multiply the strength detection value Va shown in FIG. 13 by a predetermined coefficient so that the value of the strength detection value Va matches the value of the magnetic flux density corresponding to the target magnetic field MF.

Figure 14:
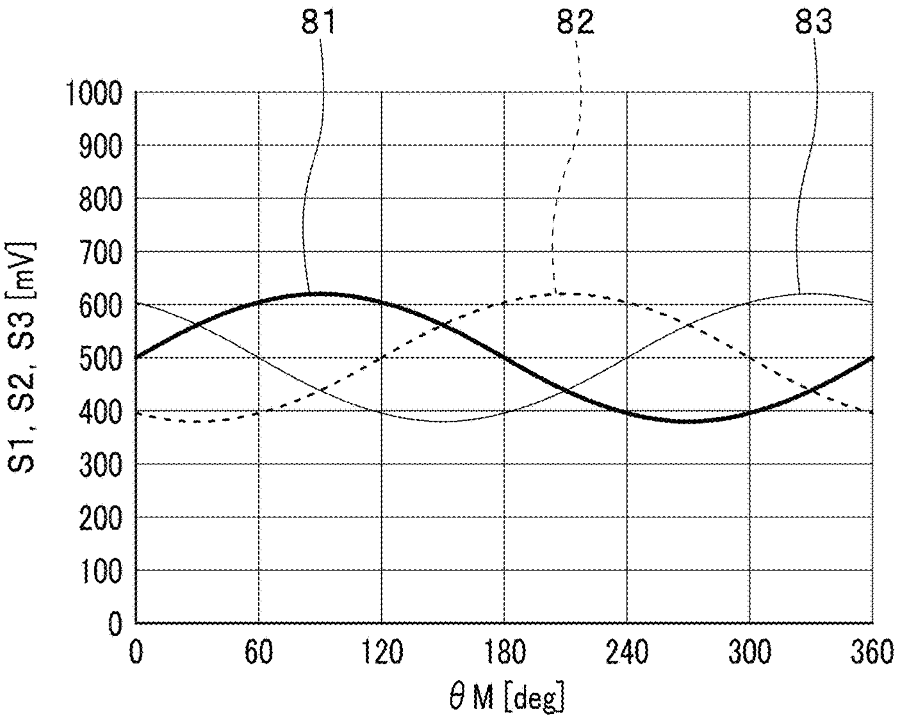
FIG. 14 is a waveform chart showing the waveforms of first to third detection signals of a second example in the first example embodiment of the technology.

Next, the second example will be described. FIG. 14 is a waveform chart showing the waveforms of the first to third detection signals S1 to S3 of the second example. The horizontal axis and the vertical axis of FIG. 14 are the same as those of FIG. 11. In FIG. 14, the curve denoted by the reference numeral 81 represents the first detection signal S1, the curve denoted by the reference numeral 82 represents the second detection signal S2, and the curve denoted by the reference numeral 83 represents the third detection signal S3. FIG. 14 shows the first to third detection signals S1 to S3 when the value of the magnetic flux density corresponding to the target magnetic field MF is 40 mT. As can be seen from FIGS. 11 and 14, the amplitude of each of the first to third detection signals S1 to S3 changes with a change in the strength of the target magnetic field MF.

Figure 15:
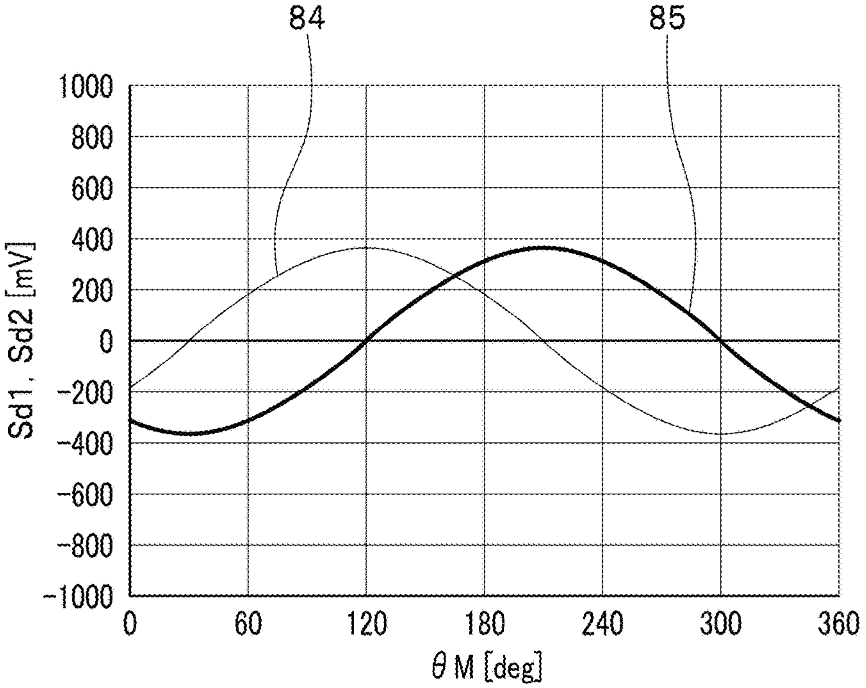
FIG. 15 is a waveform chart showing the waveforms of first and second angle calculation signals of the second example in the first example embodiment of the technology.

FIG. 15 is a waveform chart showing the waveforms of the first and second angle calculation signals Sd1 and Sd2 of the second example. The horizontal axis and the vertical axis of FIG. 15 are the same as those of FIG. 12. In FIG. 15, the curve denoted by the reference numeral 84 represents the first angle calculation signal Sd1, and the curve denoted by the reference numeral 85 represents the second angle calculation signal Sd2. FIG. 15 shows the first and second angle calculation signals Sd1 and Sd2, which are generated using the first to third signals Sa to Sc that are generated using the first to third detection signals S1 to S3 illustrated in FIG. 14 and Eqs. (1) to (3). As shown in FIG. 15, each of the first and second angle calculation signals Sd1 and Sd2 in the second example has an amplitude greater than in the first example. As shown in FIG. 15, the phase difference between the first and second angle calculation signals Sd1 and Sd2 is 90°. Like the first example, the angle detection value θs can thus be generated using the first and second angle calculation signals Sd1 and Sd2 and Eq. (4).

Figure 16:
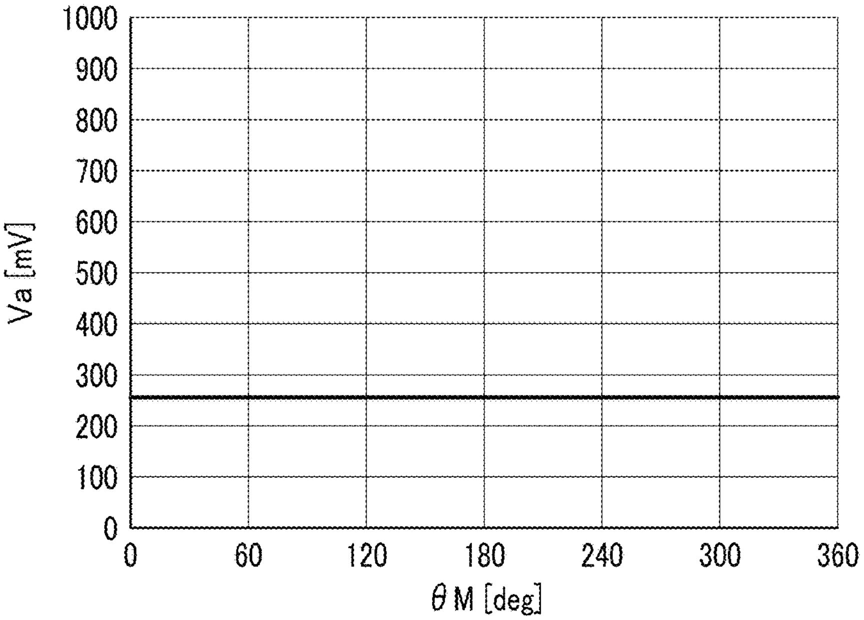
FIG. 16 is a characteristic chart showing a strength detection value of the second example in the first example embodiment of the technology.

FIG. 16 is a characteristic chart showing the strength detection value Va of the second example. The horizontal axis and the vertical axis of FIG. 16 are the same as those of FIG. 13. FIG. 16 shows the strength detection value Va generated using the first to third detection signals S1 to S3 shown in FIG. 14 and Eq. (4). As can be seen from FIGS. 13 and 16, the value of the strength detection value Va changes with a change in the strength of the target magnetic field MF.

Second Example Embodiment

Figure 17:
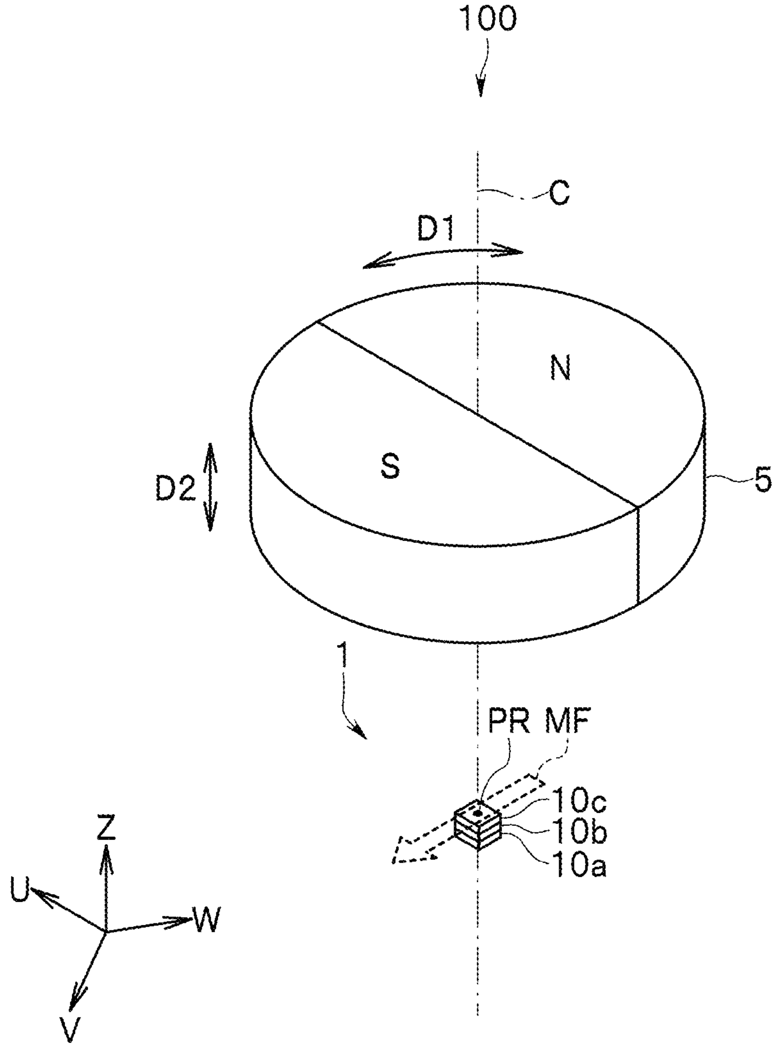
FIG. 17 is a perspective view showing a magnetic sensor system according to a second example embodiment of the technology.

Next, a configuration of a magnetic sensor system according to a second example embodiment of the technology will be described with reference to FIG. 17. FIG. 17 is a perspective view showing the magnetic sensor system according to the example embodiment.

In the example embodiment, the magnetic sensor 1 is configured to detect the target magnetic field MF at the reference position PR on the reference axis C. The first detection circuit 10*a* of the magnetic sensor 1 is configured to detect the target magnetic field MF at the reference position PR and generate the first detection signal S1. The second detection circuit 10*b* of the magnetic sensor 1 is configured to detect the target magnetic field MF at the reference position PR and generate the second detection signal S2. The third detection circuit 10*c* of the magnetic sensor 1 is configured to detect the target magnetic field MF at the reference position PR and generate the third detection signal S3.

Each of the first to third detection circuits 10*a* to 10*c* is located at a position where the target magnetic field MF at the reference position PR can be detected. For example, the first to third detection circuits 10*a* to 10*c* may be all located on the reference axis C. In other words, the positions where the respective first to third detection circuits 10*a* to 10*c* are located may fall on the reference axis C. Here, the first to third detection circuits 10*a* to 10*c* may be stacked in any order. Alternatively, the first to third detection circuits 10*a* to 10*c* may be disposed on the top surface of a support perpendicular to the reference axis C as long as the requirement that the target magnetic field MF at the reference position PR be detected is satisfied.

Each of the first to third detection circuits 10*a* to 10*c* has the same configuration as in the first example embodiment. In particular, the direction of the magnetization 51*m* of the magnetization pinned layer 51 in each of the MR elements 11*a* to 11*c* and 12*a* to 12*c* is the same as that described in the first example embodiment with reference to FIG. 4.

The configuration, operation, and effects of the present example embodiment are otherwise the same as those of the first example embodiment.

Third Example Embodiment

Figure 18:
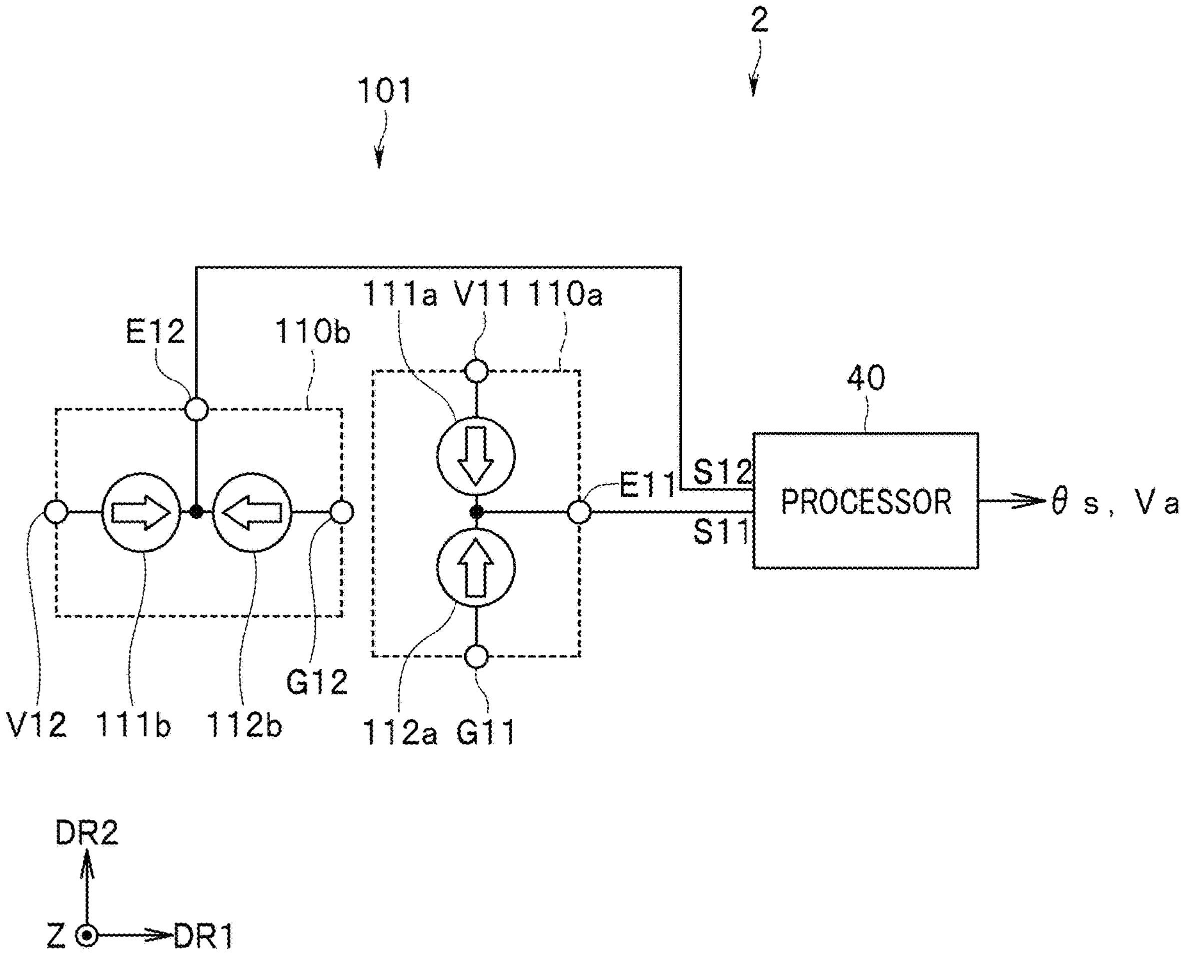
FIG. 18 is a circuit diagram showing a configuration of the magnetic sensor device according to a third example embodiment of the technology.

Next, a magnetic sensor device according to a third example embodiment of the technology will be described with reference to FIG. 18. FIG. 18 is a circuit diagram showing a configuration of the magnetic sensor device according to the example embodiment.

A magnetic sensor device 2 according to the example embodiment does not include the differential detectors 31, 32, and 33 in the first example embodiment. The magnetic sensor device 2 includes a magnetic sensor 101 instead of the magnetic sensor 1 in the first example embodiment. The magnetic sensor 101 includes a first detection circuit 110*a* and a second detection circuit 110*b*. Like the first to third detection circuits 10*a* to 10*c*, the first and second detection circuits 110*a* and 110*b* may each have a chip form, or a package form sealed with a sealing resin.

The first detection circuit 110*a* is configured to detect the target magnetic field MF at a first position and generate a first detection signal S11 that changes periodically with periodic changes in the target magnetic field MF and whose amplitude changes with a change in the strength of the target magnetic field MF. The second detection circuit 110*b* is configured to detect the target magnetic field MF at a second position and generate a second detection signal S12 that changes periodically with the periodic changes in the target magnetic field MF and whose amplitude changes with the change in the strength of the target magnetic field MF. Like the positions where the first to third detection circuits 10*a* to 10*c* in the first example embodiment are located, the first and second positions may be away from the reference axis C (see FIG. 1). Like the positions where the first to third detection circuits 10*a* to 10*c* in the second example embodiment are located, the first and second positions may fall on the reference axis C (see FIG. 17).

If the first and second positions are away from the reference axis C, the second position is a position rotated from the first position by a predetermined angle circumferentially about the reference axis C. The predetermined angle is equivalent to an odd multiple of 90° in electrical angle. In particular, in the example embodiment, a physical angle equivalent to the electrical angle of an odd multiple of 90° is also an odd multiple of 90°.

The first detection circuit 110*a* includes two MR elements 111*a* and 112*a*, a power supply port V11, a ground port G11, and an output port E11. The MR element 111*a* is provided between the power supply port V11 and the output port E11 in the circuit configuration. The MR element 112*a* is provided between the ground port G11 and the output port E11 in the circuit configuration. A voltage or current of predetermined magnitude is applied to the power supply port V11. The ground port G11 is grounded.

The second detection circuit 110*b* includes two MR elements 111*b* and 112*b*, a power supply port V12, a ground port G12, and an output port E12. The MR element 111*b* is provided between the power supply port V12 and the output port E12 in the circuit configuration. The MR element 112*b* is provided between the ground port G12 and the output port E12 in the circuit configuration. A voltage or current of predetermined magnitude is applied to the power supply port V12. The ground port G12 is grounded.

The MR elements 111*a* and 111*b* have the same configuration as that of the MR element 11 in the first example embodiment. The MR elements 112*a* and 112*b* have the same configuration as that of the MR element 12 in the first example embodiment.

Now, a DR1 direction, a DR2 direction, and a Z direction will be defined as shown in FIG. 18. The DR1, DR2, and Z directions are orthogonal to each other. The opposite direction to the DR1 direction is referred to as a −DR1 direction. The opposite direction to the DR2 direction is referred to as a −DR2 direction. The opposite direction to the Z direction is referred to as a −Z direction. An orthogonal coordinate system defined by the DR1, DR2, and Z directions shown in FIG. 18 is a reference coordinate system in the example embodiment. The Z direction of this orthogonal coordinate system agrees with the Z direction of the reference coordinate system, defined by the reference axis C shown in FIGS. 1, 2, and 17.

In FIG. 18, the MR elements 111*a*, 111*b*, 112*a*, and 112*b* are schematically shown by a figure representing a layered film 50 each. The arrow in the layered film 50 indicates the direction of the magnetization 51*m* of the magnetization pinned layer 51 of the layered film 50. In the first detection circuit 110*a*, the magnetization 51*m* of the magnetization pinned layer 51 of the MR element 111*a* includes a component in the −DR2 direction, and the magnetization 51*m* of the magnetization pinned layer 51 of the MR element 112*a* includes a component in the DR2 direction. In the second detection circuit 110*b*, the magnetization 51*m* of the magnetization pinned layer 51 of the MR element 111*b* includes a component in the DR1 direction, and the magnetization 51*m* of the magnetization pinned layer 51 of the MR element 112*b* includes a component in the −DR1 direction.

In particular, in the example embodiment, the first and second detection circuits 110*a* and 110*b* are composed of circuits having substantially the same configurations. The second detection circuit 110$b$ is equivalent to the first detection circuit 110$a$ rotated by 90° circumferentially about an axis extending in a direction parallel to the Z direction (reference axis C).

The first detection circuit 110$a$ generates a signal corresponding to the potential at the output port E11 connected to the connection point of the MR elements 111$a$ and 112$a$ as the first detection signal S11. The second detection circuit 110$b$ generates a signal corresponding to the potential at the output port E12 connected to the connection point of the MR elements 111$b$ and 112$b$ as the second detection signal S12.

Next, a method for generating the angle detection value θs and the strength detection value Va in the example embodiment will be described with reference to FIG. 18. In the example embodiment, a phase difference between the periodic component of the first detection signal S11 and the periodic component of the second detection signal S12 may be an odd multiple of ¼ of the period of the periodic components. In particular, in the example embodiment, the phase of the periodic component of the second detection signal S12 differs from that of the periodic component of the first detection signal S11 by 90°.

The processor 40 may be configured to generate the angle detection value θs using the ratio of the second detection signal S12 to the first detection signal S11. For example, the processor 40 calculates θs within the range of 0° or more and less than 360° by the following Eq. (6):

$$\theta s = \mathrm{atan}(S12/S11) \tag{6}$$

The processor 40 may be also configured to generate the strength detection value Va using the sum of squares of the first and second detection signals S11 and S12. The processor 40 may assume the sum of squares of the first and second detection signals S11 and S12 as the strength detection value Va. Alternatively, the processor 40 may calculate Va by the following Eq. (7):

$$Va = \sqrt{S11^2 + S12^2} \tag{7}$$

The configuration, operation, and effects of the present example embodiment are otherwise the same as those of the first or second example embodiment.

Fourth Example Embodiment

Figure 19:
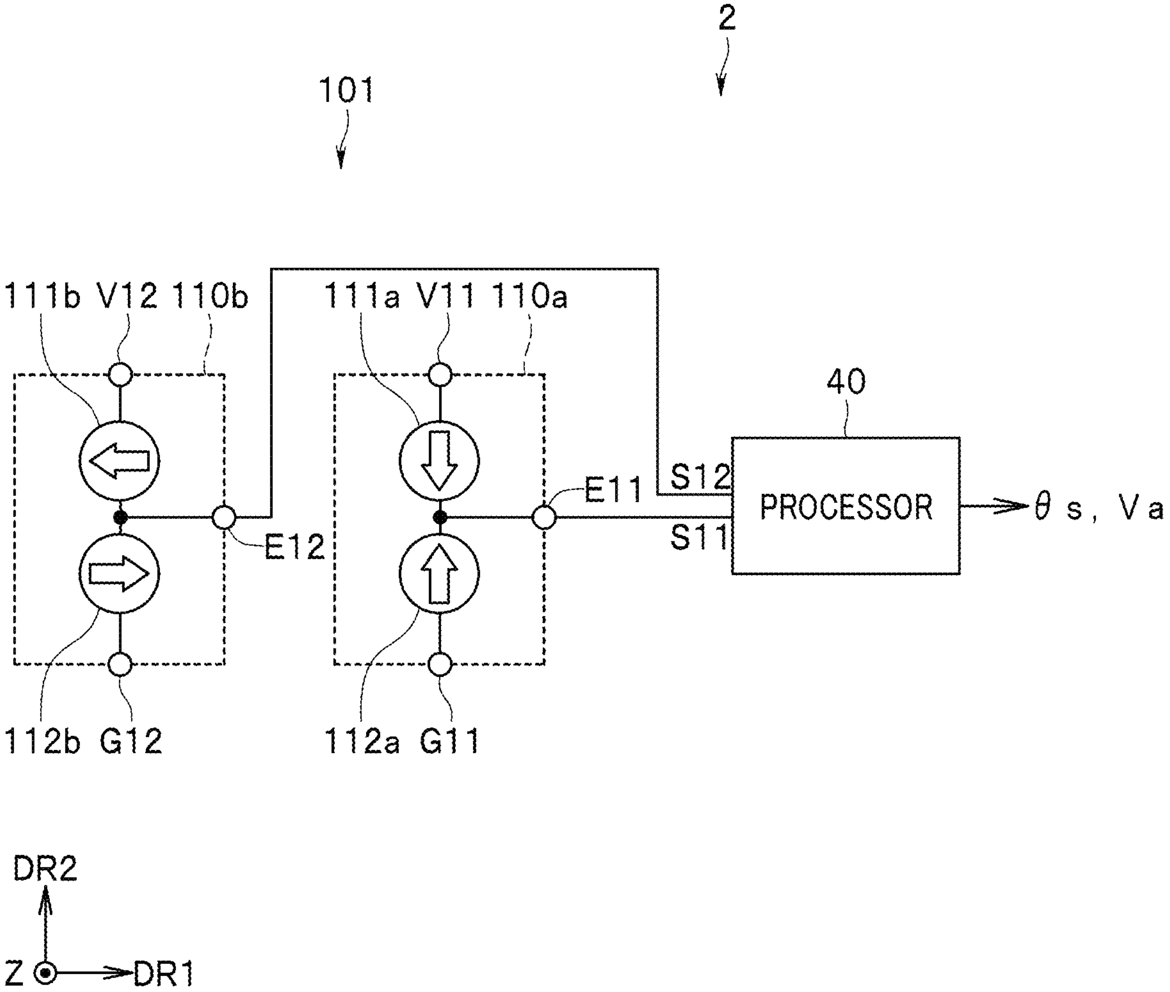
FIG. 19 is a circuit diagram showing a configuration of the magnetic sensor device according to a fourth example embodiment of the technology.

Next, a magnetic sensor device according to a fourth example embodiment of the technology will be described with reference to FIG. 19. FIG. 19 is a circuit diagram showing a configuration of the magnetic sensor device according to the example embodiment.

In the example embodiment, the first detection circuit 110$a$ and the second detection circuit 110$b$ are composed of circuits having respective different configurations. The configuration of the first detection circuit 110$a$ is the same as in the third example embodiment. The second detection circuit 110$b$ is disposed in the same orientation as the first detection circuit 110$a$. In the second detection circuit 110$b$, the magnetization 51$m$ of the magnetization pined layer 51 of the MR element 111$b$ includes a component in the −DR1 direction, and the magnetization 51$m$ of the magnetization pinned layer 51 of the MR element 112$b$ includes a component in the DR1 direction.

The configuration, operation, and effects of the present example embodiment are otherwise the same as those of the third example embodiment.

Fifth Example Embodiment

Figure 20:
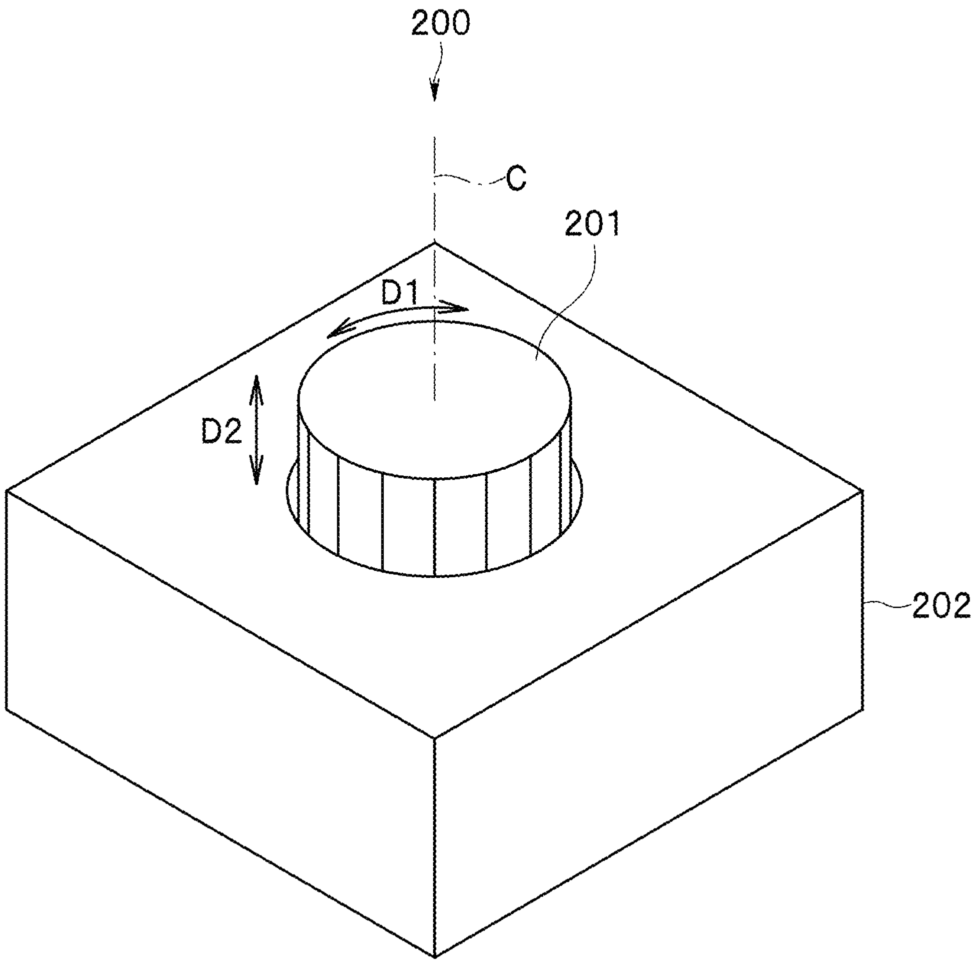
FIG. 20 is a perspective view showing an operation detection device according to a fifth example embodiment of the technology.

Next, an operation detection device according to a fifth example embodiment of the technology will be described with reference to FIG. 20. FIG. 20 is a perspective view showing the operation detection device according to the example embodiment.

An operation detection device 200 according to the example embodiment includes a component 201 and a main body 202 that accommodates at least a part of the component 201. The component 201 is configured to be capable of an operation to rotate in a circumferential direction D1 about a reference axis C and an operation to move in a direction D2 parallel to the reference axis C. The component 201 may be a knob or other such component that is manually operated. Examples of the operation detection device 200 including such a component 201 include operation devices of automotive air conditioners and car navigation systems, operation devices of digital cameras and radios, and crowns of smartwatches. The component 201 may be a component that operates in conjunction with a given driving device.

The operation detection device 200 further includes a not-shown magnetic sensor device and a not-shown magnetic field generator. The magnetic sensor device has the same configuration as that of the magnetic sensor device 2 according to any of the first to fourth example embodiments. The magnetic field generator has the same configuration as that of the magnetic field generator 5 in any of the first to fourth example embodiments.

The magnetic field generator is configured to operate in conjunction with the component 201. The rotational position of the magnetic field generator in the circumferential direction D1 has a correspondence with the rotational position of the component 201 in the circumferential direction D1. The position of the magnetic field generator in the direction D2 has a correspondence with the position of the component 201 in the direction D2.

As described in the first example embodiment, the angle detection value generated by the magnetic sensor device has a correspondence with the rotational position of the magnetic field generator. The strength detection value generated by the magnetic sensor device has a correspondence with the position of the magnetic field generator in the direction D2. According to the example embodiment, the rotational position of the component 201 and the position of the component 201 in the direction D2 can be both detected from the angle detection value and the strength detection value generated by the magnetic sensor device. The rotational position of the component 201 can be calculated, for example, by using the angle detection value and the number of rotations of the component 201 (number of rotations of the magnetic field generator) counted based on the angle detection value. The position of the component 201 in the direction D2 can be calculated, for example, by multiplying the strength detection value by a predetermined coefficient.

The configuration, operation, and effects of the present example embodiment are otherwise the same as those of any of the first to fourth example embodiments.

The technology is not limited to the foregoing example embodiments, and various modifications can be made. For example, each of the first to third detection circuits 10$a$ to 10$c$ may include a full-bridge circuit composed of four MR elements.

As described above, a magnetic sensor device according to the technology includes a magnetic sensor configured to detect a target magnetic field, and a processor. The magnetic sensor includes a plurality of detection circuits each including a magnetoresistive element. The magnetoresistive element includes a magnetization pinned layer having a magnetization whose direction is fixed, and a free layer having a magnetic vortex structure and configured so that a center of the magnetic vortex structure moves depending on the target magnetic field. The plurality of detection circuits are configured to generate a plurality of detection signals each of which changes periodically with periodic changes in a direction of the target magnetic field and whose amplitude changes with a change in a strength of the target magnetic field. The processor is configured to generate an angle detection value and a strength detection value based on the plurality of detection signals, the angle detection value having a correspondence with an angle that the direction of the target magnetic field forms with a reference direction, the strength detection value having a correspondence with the strength of the target magnetic field.

In the magnetic sensor device according to the technology, the plurality of detection circuits may be a first detection circuit and a second detection circuit. The plurality of detection signals may be a first detection signal generated by the first detection circuit and a second detection signal generated by the second detection circuit. The processor may be configured to generate the angle detection value using the ratio of the second detection signal to the first detection signal. The first and second detection signals may include respective periodic components that change with the same period. A phase difference between the periodic component of the first detection signal and the periodic component of the second detection signal may be an odd multiple of 1/4 of the period. The processor may be configured to generate the strength detection value using the sum of squares of the first and second detection signals.

In the magnetic sensor device according to the technology, the plurality of detection circuits may include a first detection circuit, a second detection circuit, and a third detection circuit. The plurality of detection signals may be a first detection signal generated by the first detection circuit, a second detection signal generated by the second detection circuit, and a third detection signal generated by the third detection circuit. The processor may be configured to generate the angle detection value using a first signal equivalent to a difference between the first and second detection signals, a second signal equivalent to a difference between the second and third detection signals, and a third signal equivalent to a difference between the third and first detection signals. The first, second, and third detection signals may include respective periodic components that change with the same period. A phase difference between the periodic components of the first and second detection signals and a phase difference between the periodic components of the second and third detection signals may be both 1/3 of the period. A phase difference between the periodic components of the first and third detection signals may be 2/3 of the period. In the magnetic sensor device according to the technology, the processor may be configured to generate the strength detection value using the sum of squares of the first, second, and third signals.

In the magnetic sensor device according to the technology, the free layer may not be saturated within a range where the strength of the target magnetic field applied to the magnetoresistive element changes.

A magnetic sensor system according to the technology includes the magnetic sensor device according to the technology and a magnetic field generator configured to generate the target magnetic field.

In the magnetic sensor system according to the technology, the magnetic sensor and the magnetic field generator may be configured so that if at least one of the magnetic sensor or the magnetic field generator rotates circumferentially about a reference axis, the direction of the target magnetic field changes, and if at least one of the magnetic sensor or the magnetic field generator moves in a direction parallel to the reference axis, the strength of the target magnetic field changes. The magnetic field generator may be configured to rotate about the reference axis and move in the direction parallel to the reference axis. The processor may be configured to detect a rotational position of the magnetic field generator using the angle detection value, and detect a position of the magnetic field generator in the direction parallel to the reference axis using the strength detection value. The magnetic sensor may be located forward of the magnetic field generator in a moving direction of the magnetic field generator in the direction parallel to the reference axis. The target magnetic field may include a component in a direction orthogonal to the reference axis.

An operation detection device according to the technology includes a component configured to be capable of an operation to rotate circumferentially about a reference axis and an operation to move in a direction parallel to the reference axis, the magnetic sensor device according to the technology, and a magnetic field generator configured to generate the target magnetic field and operate in conjunction with the component.

In the magnetic sensor device according to one embodiment of the technology, each of the plurality of detection circuits includes a magnetoresistive element. The magnetoresistive element includes the free layer having the magnetic vortex structure and configured so that the center of the magnetic vortex structure moves depending on the target magnetic field. The processor is configured to generate the angle detection value and the strength detection value based on the plurality of detection signals generated by the plurality of detection circuits of the magnetic sensor. According to one embodiment of the technology, the direction and strength of the target magnetic field can thus be both detected with a simple configuration.

Obviously, many modifications and variations of the technology are possible in the light of the above teachings. Thus, it is to be understood that, within the scope of the appended claims and equivalents thereof, the technology may be practiced in other example embodiments than the foregoing example embodiments.

What is claimed is:

1. A magnetic sensor device comprising a magnetic sensor configured to detect a target magnetic field, a magnetic field generator configured to generate the target magnetic field, and a processor, wherein:

- the magnetic sensor includes a plurality of detection circuits each including a magnetoresistive element;
- the magnetoresistive element includes a magnetization pinned layer having a magnetization whose direction is fixed, and a free layer having a magnetic vortex structure and configured so that a center of the magnetic vortex structure moves depending on the target magnetic field;
- the free layer is not saturated within a range where the strength of the target magnetic field applied to the magnetoresistive element changes;

the plurality of detection circuits are configured to generate a plurality of detection signals each of which changes periodically with periodic changes in a direction of the target magnetic field and whose amplitude changes with a change in a strength of the target magnetic field;

the magnetic sensor is located forward of the magnetic field generator in a moving direction of the magnetic field generator in the direction parallel to the reference axis; and the processor is configured to generate an angle detection value and a strength detection value based on the plurality of detection signals, the angle detection value having a correspondence with an angle that the direction of the target magnetic field forms with a reference direction, the strength detection value having a correspondence with the strength of the target magnetic field.

2. The magnetic sensor device according to claim 1, wherein:

the plurality of detection circuits are a first detection circuit and a second detection circuit;

the plurality of detection signals are a first detection signal generated by the first detection circuit and a second detection signal generated by the second detection circuit; and the processor is configured to generate the angle detection value using a ratio of the second detection signal to the first detection signal.

3. The magnetic sensor device according to claim 2, wherein:

the first and second detection signals include respective periodic components that change with a same period; and a phase difference between the periodic component of the first detection signal and the periodic component of the second detection signal is an odd multiple of ¼ of the period.

4. The magnetic sensor device according to claim 3, wherein the processor is configured to generate the strength detection value using a sum of squares of the first and second detection signals.

5. The magnetic sensor device according to claim 1, wherein:

the plurality of detection circuits include a first detection circuit, a second detection circuit, and a third detection circuit;

the plurality of detection signals are a first detection signal generated by the first detection circuit, a second detection signal generated by the second detection circuit, and a third detection signal generated by the third detection circuit; and the processor is configured to generate the angle detection value using a first signal equivalent to a difference between the first and second detection signals, a second signal equivalent to a difference between the second and third detection signals, and a third signal equivalent to a difference between the third and first detection signals.

6. The magnetic sensor device according to claim 5, wherein:

the first, second, and third detection signals include respective periodic components that change with a same period;

a phase difference between the periodic components of the first and second detection signals and a phase difference between the periodic components of the second and third detection signals are both ⅓ of the period; and a phase difference between the periodic components of the first and third detection signals is ⅔ of the period.

7. The magnetic sensor device according to claim 5, wherein the processor is configured to generate the strength detection value using a sum of squares of the first, second, and third signals.

8. The magnetic sensor system according to claim 1, wherein the magnetic sensor and the magnetic field generator are configured so that if at least one of the magnetic sensor or the magnetic field generator rotates circumferentially about a reference axis, the direction of the target magnetic field changes, and if at least one of the magnetic sensor or the magnetic field generator moves in a direction parallel to the reference axis, the strength of the target magnetic field changes.

9. The magnetic sensor system according to claim 8, wherein:

the magnetic field generator is configured to rotate about the reference axis and move in the direction parallel to the reference axis; and the processor is configured to detect a rotational position of the magnetic field generator using the angle detection value, and detect a position of the magnetic field generator in the direction parallel to the reference axis using the strength detection value.

10. The magnetic sensor system according to claim 8, wherein the target magnetic field includes a component in a direction orthogonal to the reference axis.

11. An operation detection device comprising:

a component configured to be capable of an operation to rotate circumferentially about a reference axis and an operation to move in a direction parallel to the reference axis; and the magnetic sensor device according to claim 1.

* * * * *